United States Patent
Pan et al.

(10) Patent No.: US 11,172,401 B2
(45) Date of Patent: Nov. 9, 2021

(54) METHOD AND DEVICE FOR TRANSMITTING DATA

(71) Applicant: China Academy of Telecommunications Technology, Beijing (CN)

(72) Inventors: Xueming Pan, Beijing (CN); Zukang Shen, Beijing (CN); Shaohui Sun, Beijing (CN); Yanan Lin, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 34 days.

(21) Appl. No.: 15/567,016

(22) PCT Filed: Apr. 1, 2016

(86) PCT No.: PCT/CN2016/078320
§ 371 (c)(1),
(2) Date: Oct. 16, 2017

(87) PCT Pub. No.: WO2016/165565
PCT Pub. Date: Oct. 20, 2016

(65) Prior Publication Data
US 2018/0132132 A1    May 10, 2018

(30) Foreign Application Priority Data
Apr. 16, 2015 (CN) .......................... 201510182028.6

(51) Int. Cl.
*H04W 28/06* (2009.01)
*H04W 72/04* (2009.01)
(Continued)

(52) U.S. Cl.
CPC ........... *H04W 28/06* (2013.01); *H04L 5/0053* (2013.01); *H04W 72/04* (2013.01);
(Continued)

(58) Field of Classification Search
None
See application file for complete search history.

(56) References Cited

U.S. PATENT DOCUMENTS

2010/0238847 A1* 9/2010 Suo ................ H04W 16/00
                                                                        370/280
2011/0033048 A1   2/2011 Stanwood et al.
(Continued)

FOREIGN PATENT DOCUMENTS

CN      103765806 A      4/2014
CN      104348602 A      2/2015
(Continued)

OTHER PUBLICATIONS

3GPP TSG RAN WGl Meeting #66bis, R1-113312, Alcatel-Lucent Shanghai Bell, Alcatel-Lucent, "Motivation analysis of Inter-band Carrier aggregation with different TDD UL-DL configurations", Zhuhai, China, dated Oct. 10-11, 2011.

*Primary Examiner* — Gregory B Sefcheck
*Assistant Examiner* — Suk Jin Kang
(74) *Attorney, Agent, or Firm* — Foley & Lardner LLP

(57) ABSTRACT

A method and device for transmitting data, which are used for solving the problems in the prior art that an existing frame structure would increase the user-plane delay of a TD-LTE system and decrease the system performance. A wireless frame transmitted between a network side device and a terminal comprises a reinforced sub-frame, and the reinforced sub-frame comprises a UL portion and a DL portion. A TDD frame structure of the embodiments of the present invention can decrease the user-plane delay on the basis of maintaining the service flexibility, and also can maintain the backward compatibility of a system.

22 Claims, 15 Drawing Sheets

(51) Int. Cl.
*H04W 72/12* (2009.01)
*H04L 5/00* (2006.01)

(52) U.S. Cl.
CPC ....... *H04W 72/0446* (2013.01); *H04W 72/12* (2013.01); *H04W 72/1205* (2013.01); *H04L 5/0023* (2013.01)

(56) References Cited

U.S. PATENT DOCUMENTS

| | | | |
|---|---|---|---|
| 2012/0082071 A1* | 4/2012 | Lv | H04W 72/1215 370/280 |
| 2013/0039193 A1* | 2/2013 | Yin | H04W 72/0486 370/252 |
| 2013/0083736 A1* | 4/2013 | Yin | H04W 72/0446 370/329 |
| 2013/0194980 A1* | 8/2013 | Yin | H04L 1/1607 370/280 |
| 2014/0092921 A1 | 4/2014 | Seo et al. | |
| 2014/0314069 A1* | 10/2014 | Park | H04W 56/002 370/350 |
| 2015/0023231 A1* | 1/2015 | Ji | H04B 7/2643 370/280 |
| 2015/0043392 A1* | 2/2015 | Susitaival | H04L 5/1469 370/280 |
| 2015/0071133 A1* | 3/2015 | Li | H04W 72/1278 370/278 |
| 2015/0085723 A1* | 3/2015 | Chen | H04W 72/042 370/280 |
| 2015/0085834 A1* | 3/2015 | Liu | H04W 72/0446 370/336 |
| 2015/0103702 A1* | 4/2015 | Lahetkangas | H04L 5/0044 370/280 |
| 2015/0327263 A1* | 11/2015 | Chen | H04W 72/0446 370/280 |
| 2016/0014746 A1* | 1/2016 | Ode | H04L 5/001 370/330 |
| 2016/0044667 A1* | 2/2016 | Chen | H04W 72/0446 370/329 |
| 2016/0157248 A1* | 6/2016 | Lin | H04W 24/00 370/329 |
| 2016/0269157 A1* | 9/2016 | Soriaga | H04B 7/0617 |
| 2016/0309461 A1* | 10/2016 | Yin | H04L 5/0073 |
| 2016/0330737 A1* | 11/2016 | Takeda | H04W 72/0446 |
| 2016/0337110 A1* | 11/2016 | Yang | H04L 1/1854 |
| 2016/0338049 A1* | 11/2016 | Takeda | H04L 5/001 |
| 2017/0019218 A1* | 1/2017 | Sadeghi | H04L 5/001 |
| 2017/0034824 A1* | 2/2017 | Liu | H04L 5/0064 |
| 2017/0041122 A1* | 2/2017 | Li | H04L 5/0092 |
| 2017/0064705 A1* | 3/2017 | Lee | H04L 1/0026 |
| 2017/0257244 A1* | 9/2017 | Gao | H04W 72/0413 |
| 2018/0069673 A1* | 3/2018 | Soriaga | H04B 7/0452 |
| 2018/0077703 A1* | 3/2018 | Sun | H04L 5/1469 |
| 2018/0175975 A1* | 6/2018 | Um | H04L 1/1816 |
| 2018/0198586 A1* | 7/2018 | Yoon | H04L 5/0007 |
| 2019/0253295 A1* | 8/2019 | Gao | H04L 5/0044 |

FOREIGN PATENT DOCUMENTS

| | | |
|---|---|---|
| CN | 104349459 A | 2/2015 |
| JP | 2011-502410 A | 1/2011 |
| KR | 20140136923 A | 12/2014 |
| WO | WO-2013/141770 A1 | 9/2013 |
| WO | WO 2014/067140 A1 | 5/2014 |

* cited by examiner

Configuration 1 of Type 1 enhanced subframe
DL=UL

Configuration 2 of Type 1 enhanced subframe
DL>UL

Configuration 3 of Type 1 ehanced subframe
DL<UL

Configuration 1 of Type 2 enhanced subframe DL=UL

Configuration 2 of Type 2 enhanced subframe UL>DL

Configuration 3 of Type 2 enhanced subframe
UL<DL

Configuration 1 of Type 2 enhanced subframe
DL=UL

Configuration 2 of Type 2 enhanced subframe UL>DL

Configuration 3 of Type 2 enhanced subframe UL<DL

Configuration 1 of Type 2 enhanced subframe
DL=UL

Configuration 2 of Type 2 enhanced subframe UL>DL

Configuration 3 of Type 2 enhanced subframe UL<DL

METHOD AND DEVICE FOR TRANSMITTING DATA

This application is a US National Stage of International Application No. PCT/CN2016/078320, filed on Apr. 1, 2016, designating the United States, and claiming priority to Chinese Patent Application No. 201510182028.6, filed to Chinese Patent Office on Apr. 16, 2015, titled "METHOD AND DEVICE FOR TRANSMITTING DATA", the entire contents of which are incorporated herein by reference.

FIELD

The present invention relates to the field of wireless communication techniques, and in particular to a method and device for transmitting data.

BACKGROUND

As one of the two basic duplex modes. TDD (Time division duplex) mode has attracted more and more attentions when there are increasing demands for bandwidth in broadband mobile communication. In a TDD system, the same frequency resources are used in uplink and downlink transmissions, and uplink/downward signals are transmitted in different slots. In common TDD systems, including a 3G TD-SCDMA (Time Division Synchronized Code Division Multiple Access) system and a 4G TD-LTE (TD-SCDMA Long Term Evolution) system, the division of uplink and downlink slots is static or semi-static, and usually the proportions of uplink and downlink slots are divided according to the cell type and approximate service proportions and remain unchanged in the process of network planning. A frame structure, as shown in FIG. 1, is used in the TDD mode of 3GPP (3rd Generation Partnership Project, 3rd Generation mobile communication standardization organization) LTE (Long Term Evolution) Rel (Release)-8/9/10/11/12/13.

The user plane delay of an LTE system consists of eNB processing time, frame alignment time, TTI (transmission time interval) duration and user equipment processing time, wherein the frame alignment time is the waiting time from service arrival to the time when service can acquire air interface subframe transmission opportunities.

A TD-LTE system using an existing frame structure can better adapt to the demand for different proportions of uplink and downlink services in the network, but has a user plane delay performance inferior to an FDD (frequency division duplex) system, and has the user plane delay twice that of an FDD system in some cases.

With the development of the demand for mobile communication service, it is difficult to achieve a user plane delay performance similar or equivalent to an FDD system using an existing TD-LTE frame structure.

In summary, an existing frame structure will increase the user plane delay of a TD-LTE system, and reduce the system performance.

SUMMARY

The invention provides a method and device for transmitting data, so as to solve the problems in the prior art that an existing frame structure will increase the user plane delay of an TD-LTE system and reduce the system performance.

A method for transmitting data in accordance with an embodiment of the invention includes:

determining, a network side device, a radio frame, wherein the radio frame includes an enhanced subframe, and the enhanced subframe includes a UL portion and a DL portion; and communicating, the network side device, with a user equipment through the radio frame.

Optionally, the network side device communicates with the user equipment through the radio frame, including:

receiving, by the network side device, a part of or all of uplink pilot, uplink service data and uplink control signaling through the UL portion in the enhanced subframe; and/or, transmitting, by the network side device, a part of or all of downlink pilot, downlink service data and downlink control signaling through the DL portion in the enhanced subframe.

Optionally, the network side device determines the radio frame, including:

determining, by the network side device, the length of the UL portion and the length of the DL portion in the enhanced subframe;

wherein, the length of the UL portion is equal to or different from the length of the DL portion in the enhanced subframe.

Optionally, the enhanced subframe in the radio frame includes an enhanced subframe of a first type and/or an enhanced subframe of a second type;

wherein, the DL portion is prior to the UL portion in the enhanced subframe of the first type; and the UL portion is prior to the DL portion in the enhanced subframe of the second type.

Optionally, the UL portion in the enhanced subframe includes N OFDM symbols, where N is a positive integer; and the DL portion in the enhanced subframe includes M OFDM symbols, where M is a positive integer.

Optionally, M is equal to N.

Optionally, the length of the UL portion in different enhanced subframes of the radio frame is equal or different.

Optionally, the length of the DL portion in different enhanced subframes of the radio frame is equal or different.

Optionally, the enhanced subframe further includes a guard period GP portion.

Optionally, the GP portion in the enhanced subframe is between the DL portion and the UL portion; or the GP portion in the enhanced subframe is at the end of the enhanced subframe; or the GP portion in the enhanced subframe is at the beginning of the enhanced subframe.

Optionally, the radio frame includes at least one enhanced subframe with the GP portion and at least one enhanced subframe without the GP portion; or the radio frame includes at least one enhanced subframe, all of which have the GP portion; or the radio frame includes at least one enhanced subframe, none of which has the GP portion.

Optionally, in a plurality of the enhanced subframes with GP portions in the radio frame, the positions of the GP portions in their respective enhanced subframes are completely identical or partially identical or completely different.

Optionally, the length of a downlink TTI of the enhanced subframe is less than the length of one subframe; and/or the length of an uplink TTI of the enhanced subframe is less than the length of one subframe.

Optionally, the length of a downlink TTI of the enhanced subframe is equal to the length of half a subframe; or the length of a downlink TTI of the enhanced subframe is equal to the length of the DL portion in the enhanced subframe; and/or the length of an uplink TTI of the enhanced subframe is equal to the length of half a subframe; or the length of an uplink TTI of the enhanced subframe is equal to the length of the UL portion in the enhanced subframe.

Optionally, the radio frame further includes at least one downlink subframe and/or at least one uplink subframe.

Optionally, the length of a downlink TTI of the downlink subframe is equal to or less than the length of one subframe; and/or the length of an uplink TTI of the uplink subframe is equal to or less than the length of one subframe.

Optionally, the method further includes:

the network side device configuring the radio frame for the user equipment.

Another method for transmitting data in accordance with an embodiment of the invention includes:

determining, by a user equipment, a radio frame, wherein the radio frame includes an enhanced subframe, and the enhanced subframe includes a UL portion and a DL portion; and communicating, by the user equipment, with a network side device through the radio frame.

Optionally, communicating, by the user equipment, with the network side device through the radio frame, including:

transmitting, by the user equipment, a part of or all of uplink pilot, uplink service data and uplink control signaling through the UL portion in the enhanced subframe; and/or, receiving, by the user equipment, a part of or all of downlink pilot, downlink service data and downlink control signaling through the DL portion in the enhanced subframe.

Optionally, determining, by the user equipment, the radio frame, including:

determining, by the user equipment, the length of the UL portion and the length of the DL portion in the enhanced subframe;

wherein, the length of the UL portion is equal to or different from the length of the DL portion in the enhanced subframe.

Optionally, the enhanced subframe in the radio frame includes an enhanced subframe of a first type and/or an enhanced subframe of a second type;

wherein, the DL portion is prior to the UL portion in the enhanced subframe of the first type, and the UL portion is prior to the DL portion in the enhanced subframe of the second type.

Optionally, the UL portion in the enhanced subframe includes N OFDM symbols, where N is a positive integer; and the DL portion in the enhanced subframe includes M OFDM symbols, where M is a positive integer.

Optionally, M is equal to N.

Optionally, the length of the UL portion in different enhanced subframes of the radio frame is equal or different.

Optionally, the length of the DL portion in different enhanced subframes of the radio frame is equal or different.

Optionally, the enhanced subframe further includes a guard period GP portion.

Optionally, the GP portion in the enhanced subframe is between the DL portion and the UL portion; or the GP portion in the enhanced subframe is at the end of the enhanced subframe; or the GP portion in the enhanced subframe is at the beginning of the enhanced subframe.

Optionally, the radio frame includes at least one enhanced subframe with the GP portion and at least one enhanced subframe without the GP portion; or the radio frame includes at least one enhanced subframe, all of which have the GP portion; or the radio frame includes at least one enhanced subframe, none of which has the GP portion.

Optionally, in a plurality of the enhanced subframes with GP portions in the radio frame, the positions of the GP portions in their respective enhanced subframes are completely identical or partially identical or completely different.

Optionally, the length of a downlink TTI of the enhanced subframe is less than the length of one subframe; and/or the length of an uplink TTI of the enhanced subframe is less than the length of one subframe.

Optionally, the length of a downlink TTI of the enhanced subframe is equal to the length of half a subframe; or the length of a downlink TTI of the enhanced subframe is equal to the length of the DL portion in the enhanced subframe; and/or the length of an uplink TTI of the enhanced subframe is equal to the length of half a subframe; or the length of an uplink TTI of the enhanced subframe is equal to the length of the UL portion in the enhanced subframe.

Optionally, the radio frame further includes at least one downlink subframe and/or at least one uplink subframe.

Optionally, the length of a downlink TTI of the downlink subframe is equal to or less than the length of one subframe; and/or the length of an uplink TTI of the uplink subframe is equal to or less than the length of one subframe.

Optionally, determining, by the user equipment, the radio frame, including:

determining, by the user equipment, the radio frame according to the configuration of a network side device.

A network side device for transmitting data in accordance with an embodiment of the invention includes:

a first determination module, configured for determining a radio frame, wherein the radio frame includes an enhanced subframe, and the enhanced subframe includes a UL portion and a DL portion; and a first communication module, configured for communicating with a user equipment through the radio frame.

Optionally, the first communication module is configured for:

receiving a part of or all of uplink pilot, uplink service data and uplink control signaling through the UL portion in the enhanced subframe; and/or, transmitting a part of or all of downlink pilot, downlink service data and downlink control signaling through the DL portion in the enhanced subframe.

Optionally, the first determination module is configured for:

determining the length of the UL portion and the length of the DL portion in the enhanced subframe;

wherein, the length of the UL portion is equal to or different from the length of the DL portion in the enhanced subframe.

A user equipment for transmitting data in accordance with an embodiment of the invention includes:

a second determination module, configured for determining a radio frame, wherein the radio frame includes an enhanced subframe, and the enhanced subframe includes a UL portion and a DL portion; and a second communication module, configured for communicating with a network side device through the radio frame.

Optionally, the second communication module is configured for:

transmitting a part of or all of uplink pilot, uplink service data and uplink control signaling through the UL portion in the enhanced subframe; and/or, receiving a part of or all of downlink pilot, downlink service data and downlink control signaling through the DL portion in the enhanced subframe.

Optionally, the second determination module is configured for:

determining the length of the UL portion and the length of the DL portion in the enhanced subframe;

wherein, the length of the UL portion is equal to or different from the length of the DL portion in the enhanced subframe.

In a technical solution provided in an embodiment of the invention, a radio frame for transmission between a network side device and a user equipment includes an enhanced subframe, which includes a UL (uplink) portion and a DL (downlink) portion. A TDD frame structure according to an embodiment of the invention can not only reduce the user plane delay on the basis of maintaining the service flexibility, but also maintain the backward compatibility of a system.

DETAILED DESCRIPTION

In a technical solution provided in an embodiment of the invention, a radio frame for transmission between a network side device and a user equipment includes an enhanced subframe, which includes a UL portion and a DL portion. A TDD frame structure in accordance with an embodiment of the invention can not only reduce the user plane delay while maintaining the service flexibility, but also maintain the backward compatibility of a system, as shown in the following description.

Figure 1:
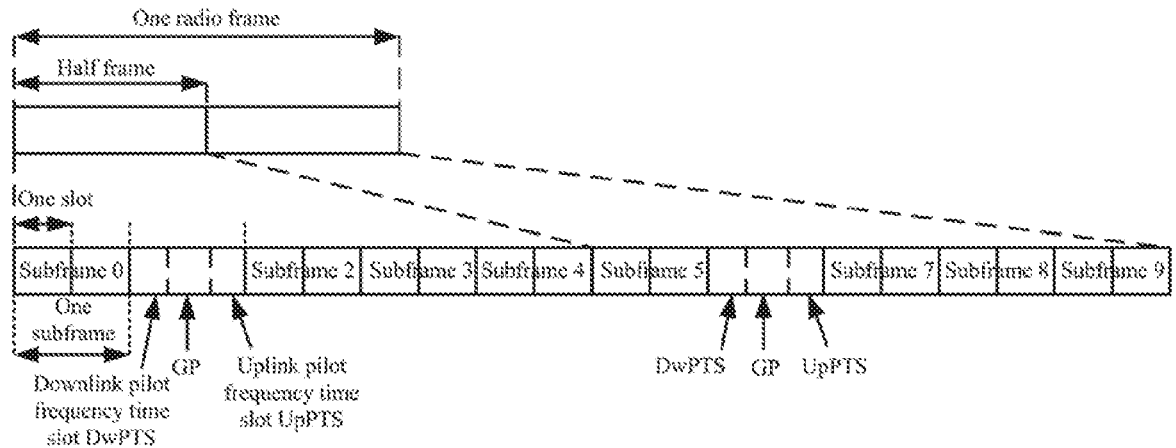
FIG. 1 is a schematic diagram of a frame structure of a TD-LTD system in accordance with the prior art.
Figure 2:
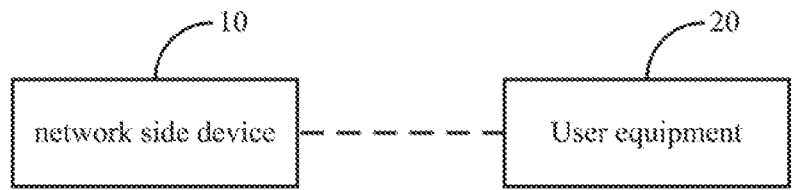
FIG. 2 is a structural diagram of a system for transmitting data in accordance with an embodiment of the invention.

As shown in FIG. 2, a system for transmitting data in accordance with an embodiment of the invention includes a network side device 10 and a user equipment 20.

The network side device 10 is configured for determining a radio frame, wherein the radio frame includes an enhanced subframe, and the enhanced subframe includes a UL portion and a DL portion; and communicates with the user equipment 20 through the radio frame.

The user equipment 20 is configured for determining a radio frame, wherein the radio frame includes an enhanced subframe, and the enhanced subframe includes a UL portion and a DL portion; and communicates with the network side device 10 through the radio frame.

In a frame structure presented in an embodiment of the invention, a radio frame at least includes an enhanced subframe, which includes at least a DL portion and a UL portion. The frame structure in an embodiment of the invention may be used in a TD-LTE system, and may also be used in other systems.

Optionally, the network side device receives a part of or all of uplink pilot, uplink service data and uplink control signaling through the UL portion in the enhanced subframe. Correspondingly, the user equipment transmits a part of or all of uplink pilot, uplink service data and uplink control signaling through the UL portion in the enhanced subframe.

Optionally, the network side device transmits a part of or all of downlink pilot, downlink service data and downlink control signaling through the DL portion.

Correspondingly, the user equipment receives a part of or all of downlink pilot, downlink service data and downlink control signaling through the DL portion.

Optionally, the lengths of the UL portions in different enhanced subframes of the radio frame are equal or different.

Optionally, the lengths of the DL portions in different enhanced subframes of the radio frame are equal or different.

Optionally, the enhanced subframe in an embodiment of the invention may further include a GP portion, and the network side device and the user equipment do not transmit signals in the GP portion.

Optionally, a GP portion in the enhanced subframe is between the DL portion and the UL portion.

Alternatively, a GP portion in the enhanced subframe is at the end of the enhanced subframe.

Alternatively, a GP portion in the enhanced subframe is at the beginning of the enhanced subframe.

Optionally, in different enhanced subframes with GP portions in the radio frame, the positions of the GP portions in their respective enhanced subframes are completely identical or partially identical or completely different.

For example, the positions of the GP portions may be completely identical, and in each enhanced subframe of the radio frame, all GP portions may be at the end or at the front or in the middle of the enhanced frame.

Optionally, when determining a radio frame, the network side device and the user equipment further need to determine the length of the UL portion and the DL portion in the enhanced subframe; wherein the length of the UL portion and the length of the DL portion in the enhanced subframe are equal or different.

The enhanced subframe of the radio frame in an embodiment of the invention includes an enhanced subframe of a first type and/or an enhanced subframe of a second type.

The DL portion is prior to the UL portion in the enhanced subframe of the first type; and the UL portion is prior to the DL portion in the enhanced subframe of the second type.

That is, the DL portion is before the UL portion in the enhanced subframe of the first type, which is called the Type 1 enhanced subframe in this application; and the UL portion is before the DL portion in the enhanced subframe of the second type, which is called the Type 2 enhanced subframe in this application.

In implementation of the enhanced subframe structures of both types, the time length of the DL portion, time length of the GP portion and time length of the UL portion may be adjusted according to the uplink or downlink service demand, cell coverage area, etc., and the sum of the three time lengths is the time length of 1 subframe. In an OFDM (Orthogonal Frequency Division Multiplexing) system, the DL portion or the UL portion includes N OFDM symbols, where N is an integer. The length configuration of the three portions can be specified in a protocol or preconfigured by the system, or can be configured by broadcasting, user specific control signaling, or the like.

In implementation, a radio frame not only includes an enhanced subframe, but also may further include one or more downlink subframes, and/or, one or more uplink subframes, The downlink subframe may transmit downlink pilot, downlink service data, downlink control signaling, etc.; and the uplink subframe may transmit uplink pilot, uplink service data, uplink control signaling, etc.

In a TD-LTE frame structure in accordance with an embodiment of the invention, a radio frame not only includes an enhanced subframe, but also may further include one or more downlink subframes, and/or, one or more subframes, wherein the downlink subframe may transmit downlink pilot, downlink service data, downlink control signaling, etc.; and the uplink subframe may transmit uplink pilot, uplink service data, uplink control signaling, etc.

Figure 3A:
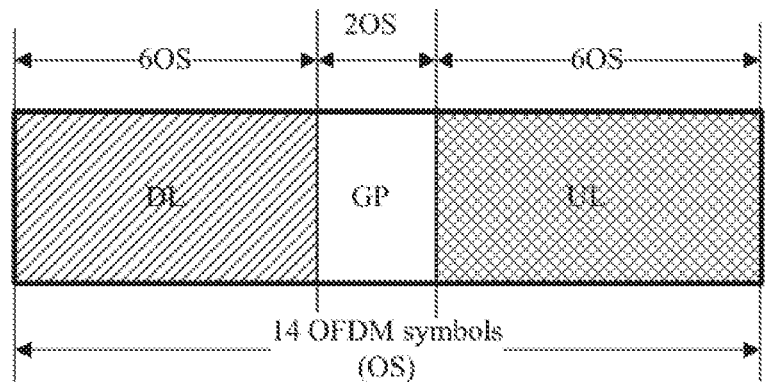
FIG. 3A is a schematic diagram of a first enhanced subframe of a first type in accordance with an embodiment of the invention.
Figure 3B:
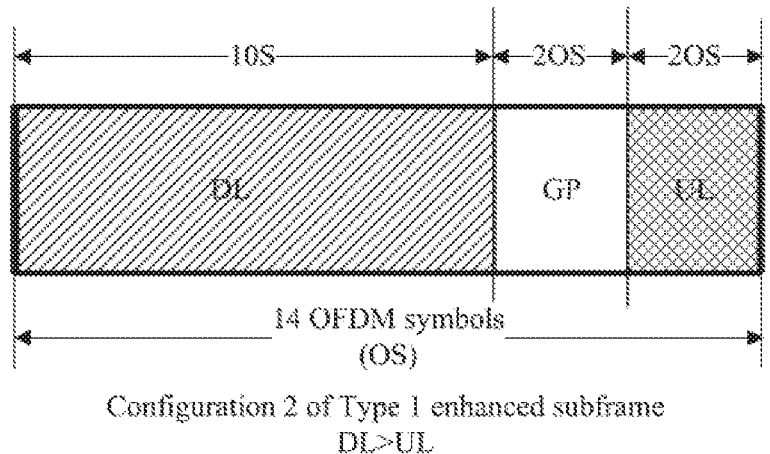
FIG. 3B is a schematic diagram of a second enhanced subframe of a first type in accordance with an embodiment of the invention.
Figure 3C:
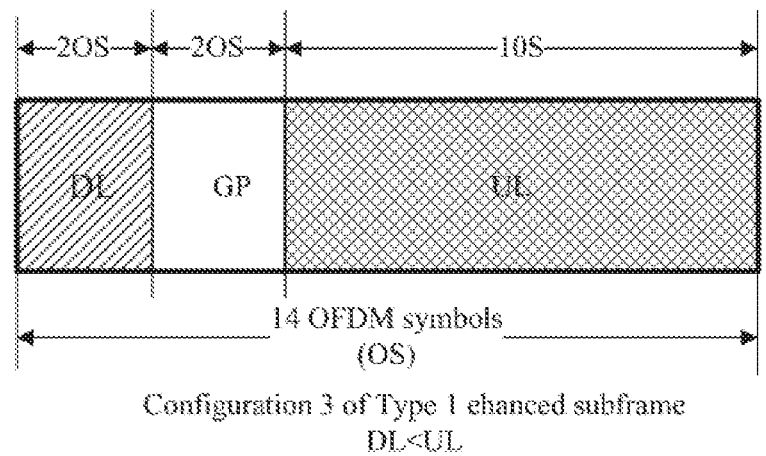
FIG. 3C is a schematic diagram of a third enhanced subframe of a first type in accordance with an embodiment of the invention.
Figure 4A:
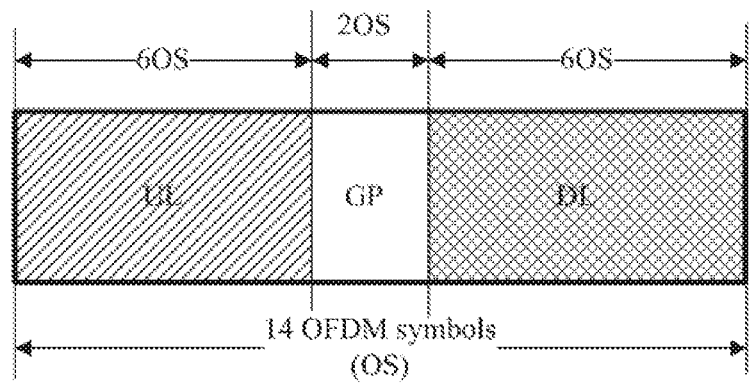
FIG. 4A is a schematic diagram of a first enhanced subframe of a second type with a GP (guard period) in its middle in accordance with an embodiment of the invention.
Figure 4B:
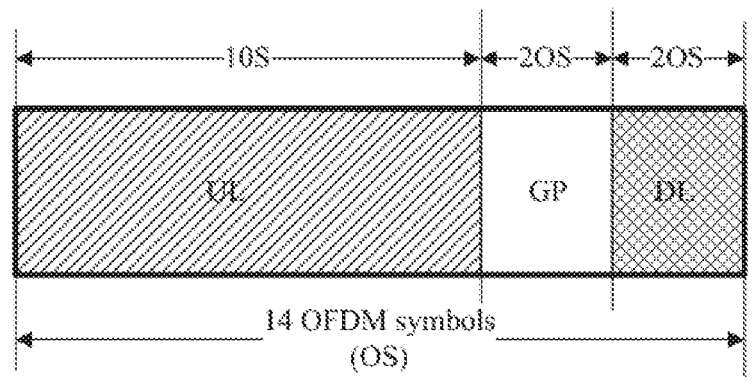
FIG. 4B is a schematic diagram of a second enhanced subframe of a second type with a GP in its middle in accordance with an embodiment of the invention.
Figure 4C:
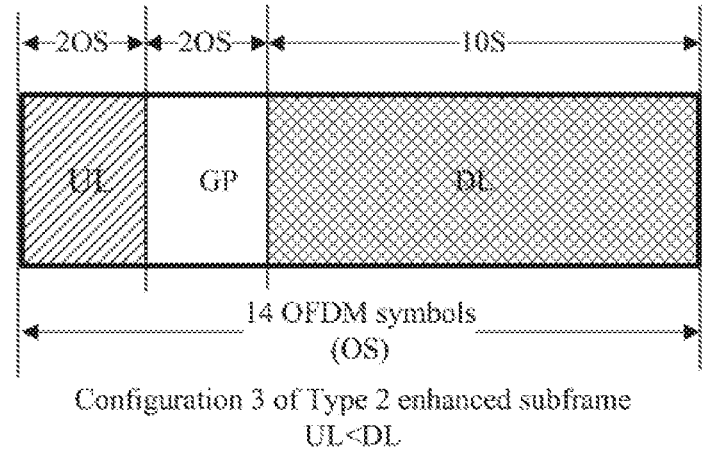
FIG. 4C is a schematic diagram of a third enhanced subframe of a second type with a GP in its middle in accordance with an embodiment of the invention.
Figure 5A:
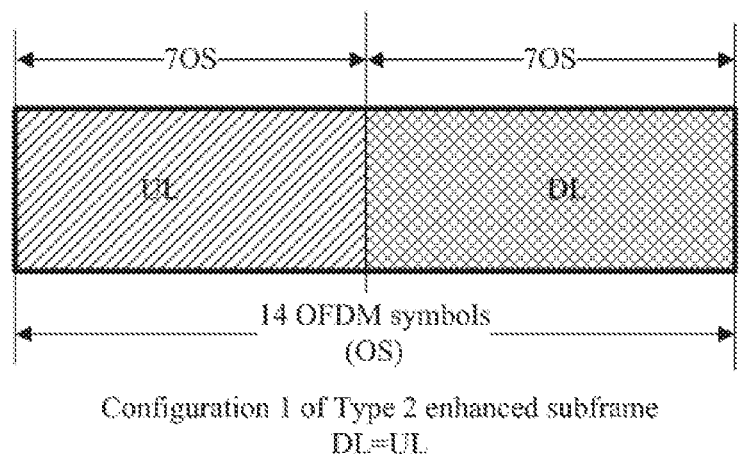
FIG. 5A is a schematic diagram of a first enhanced subframe of a second type without a GP in accordance with an embodiment of the invention.
Figure 5B:
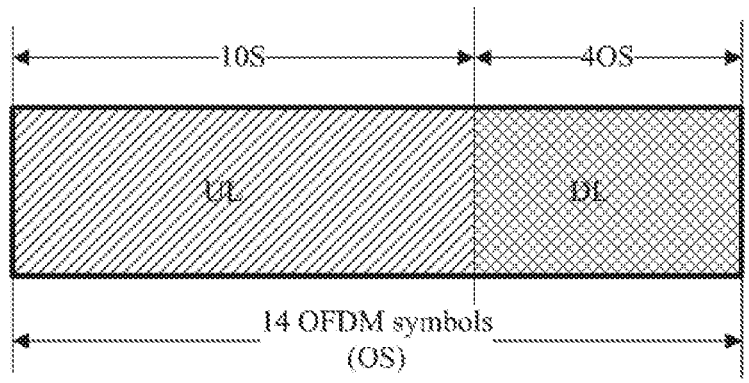
FIG. 5B is a schematic diagram of a second enhanced subframe of a second type without a GP in accordance with an embodiment of the invention.
Figure 5C:
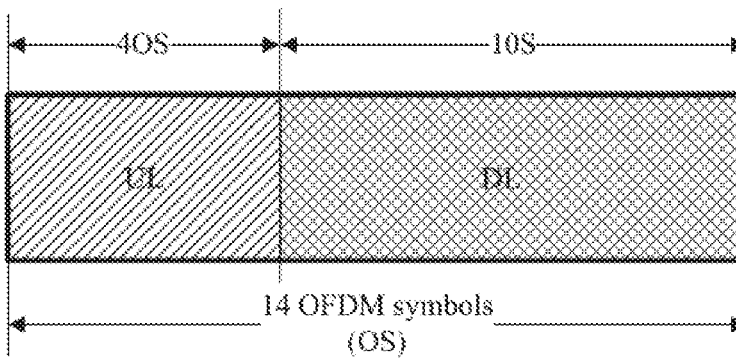
FIG. 5C is a schematic diagram of a third enhanced subframe of a second type without a GP in accordance with an embodiment of the invention.
Figure 6A:
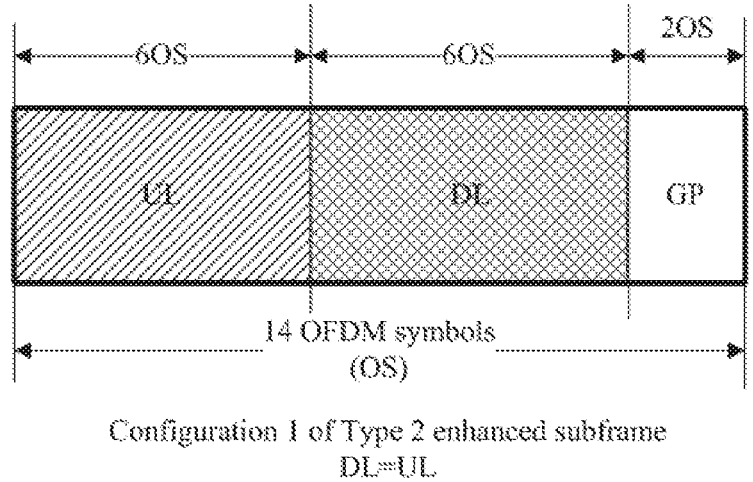
FIG. 6A is a schematic diagram of a first enhanced subframe of a second type with a GP in its end in accordance with an embodiment of the invention.
Figure 6B:
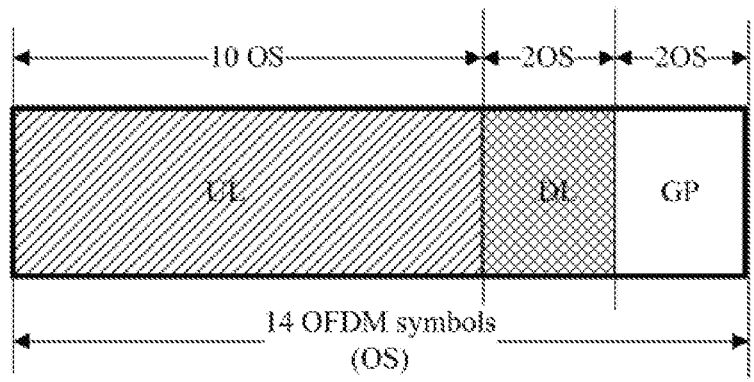
FIG. 6B is a schematic diagram of a second enhanced subframe of a second type with a GP in its end in accordance with an embodiment of the invention.
Figure 6C:
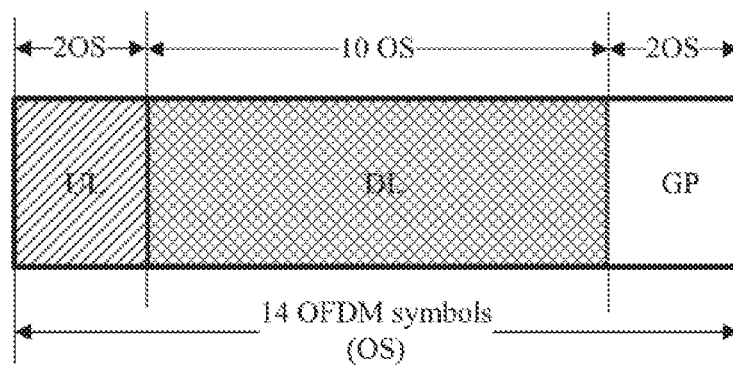
FIG. 6C is a schematic diagram of a third enhanced subframe of a second type with a GP in its end in accordance with an embodiment of the invention.

Taking a subframe including 14 OFDM symbols as an example, FIG. 3A to FIG. 3C provide some typical configurations of type 1 enhanced subframes, wherein a GP is in an intermediate position. Of course, a GP at other positions is also suitable, which is easily understood by those skilled in the art, and is not illustrated any more.

FIG. 4A to FIG. 6C provide some typical configurations of type 2 enhanced subframes, and the enhanced subframes shown in the figures are different because of different configurations of GP portions. A figure where a GP is at the front is similar to the figures, and is not described in detail any more.

It should be noted that the time length of each portion in the figures is only illustrative, may also be set as other time lengths as required and according to simulation, etc., and is not described in detail any more herein.

Optionally, the length of a downlink TTI of the enhanced subframe is less than the length of one subframe.

For example, the length of a downlink TTI of the enhanced subframe is equal to the length of half a subframe; or the length of a downlink TTI of the enhanced subframe is equal to the length of the DL portion in the enhanced subframe.

Optionally, the length of an uplink TTI of the enhanced subframe is less than the length of one subframe.

For example, the length of an uplink TTI of the enhanced subframe is equal to the length of the UL portion in the enhanced subframe; or the length of an uplink TTI of the enhanced subframe is equal to the length of the UL portion in the enhanced subframe.

In an embodiment of the invention, the length of a TTI of a downlink subframe or an uplink subframe of a radio frame may be equal to the length of one subframe, or the length of a downlink TTI and/or an uplink TTI may be less than the length of one subframe. For example, the length of one subframe is 1 ms or 0.2 ms, and the length of a corresponding TTI is equal to that of a subframe, i.e., 1 ms or 0.2 ms. When the length of a downlink TTI and/or an uplink TTI is less than the length of one subframe, a downlink subframe and/or an uplink subframe may include a plurality of TTIs. For example, the length of a subframe is 1 ms, and the length of a TTI is 0.5 ms, then one subframe includes 2 TTIs. For another example, the length of a subframe is 1 ms, and the length of a TTI is 0.2 ms. For still another example, the length of a subframe is 1 ms, and the length of a TTI is equal to the length of an OFDM symbol, e.g. about 70 us. The length of a subframe in a radio frame may be of any value. In an embodiment, the length of a subframe in a system is 1 ms. In another embodiment, the length of a subframe in a system is 0.2 ms.

In an application of a radio frame of a TDD communication system according to an embodiment of the invention, the radio frame includes at least one enhanced subframe, wherein the number of enhanced subframes, their positions in the radio frame, etc. are determined by a network device, and the determination result may be informed to a user equipment by way of protocol specification, network pre-configuration (e.g. system broadcasting or RRC (radio resource control) signaling), or dynamic control signaling indication (e.g. MAC (medium access control)) signaling or physical layer signaling PDCCH (physical downlink control channel) or the like.

Three embodiments are given below in conjunction with FIG. 7A to FIG. 7C.

Figure 7A:
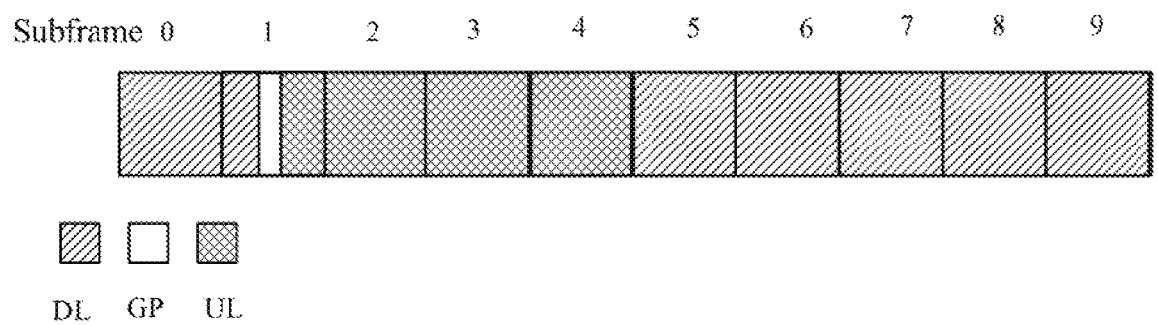
FIG. 7A is a schematic diagram of a radio frame including one enhanced subframe in accordance with an embodiment of the invention.
Figure 7B:
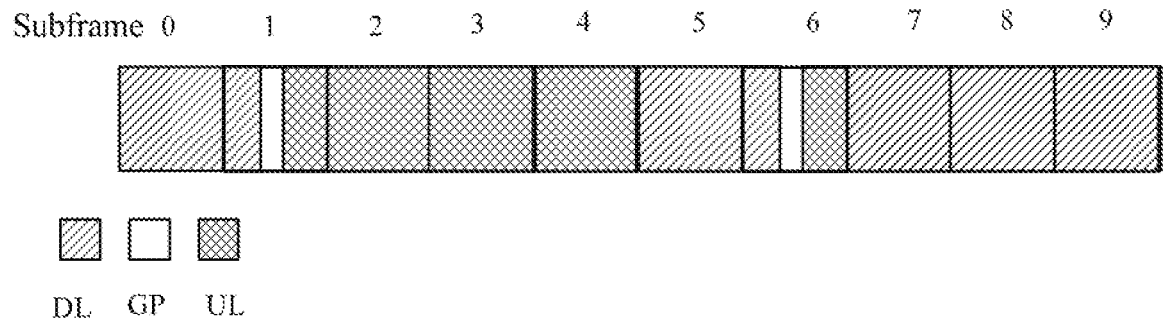
FIG. 7B is a schematic diagram of a radio frame including two enhanced subframes in accordance with an embodiment of the invention.
Figure 7C:
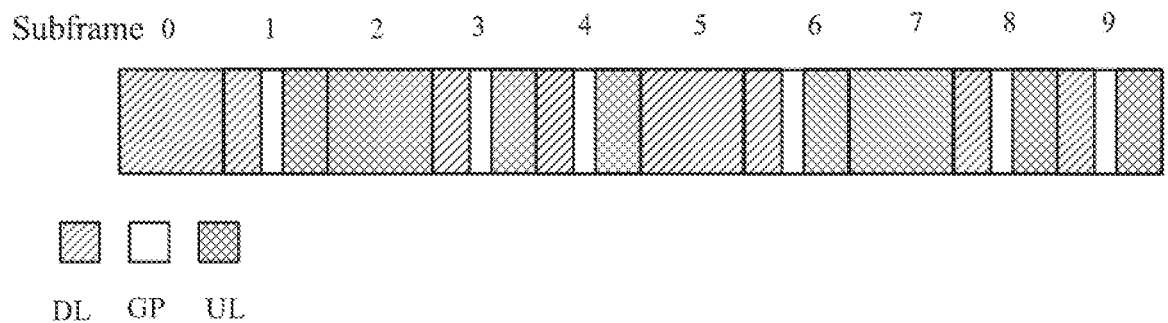
FIG. 7C is a schematic diagram of a radio frame including six enhanced subframes in accordance with an embodiment of the invention.

In the examples given in FIG. 7A to FIG. 7C, all enhanced subframes are of a same type, i.e. type 1 enhanced subframe, and the length configurations of a DL portion, a GP portion and a UL portion in each enhanced subframe are identical. In implementation, enhanced subframes of only one type may be used in a radio frame (only type 1 enhanced subframe is used or only type 2 enhanced subframe is used). When there is a plurality of enhanced subframes of one type in a radio frame, different enhanced subframes may use different length configurations of DL, GP and UL.

It should be noted that, FIG. 7A to FIG. 7C are only illustrative, and are only used to teach those skilled in the art on how to specifically implement the invention. In the implementation process, a corresponding embodiment may be determined in conjunction with the practical requirements.

Figure 8:
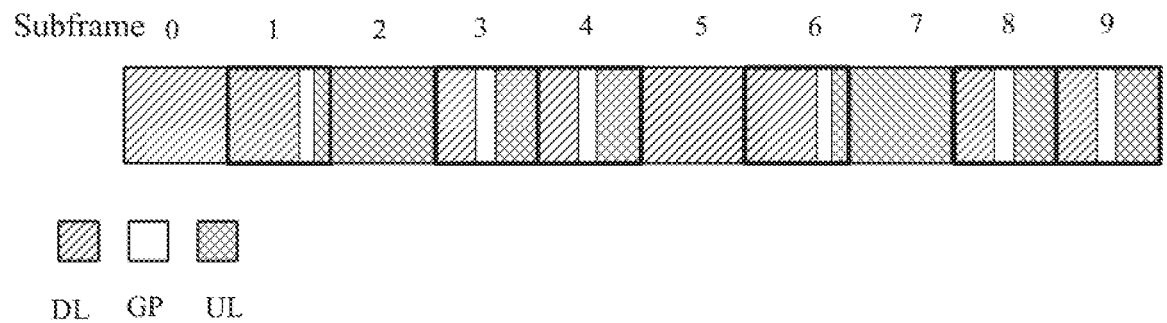
FIG. 8 is a schematic diagram of a plurality of enhanced subframes using different structural configurations in accordance with an embodiment of the invention.

An embodiment shown in FIG. 8 is described below Enhanced subframes #1 and #6 in FIG. 8 have an equal length configuration of DL, GP and UL, and other enhanced subframes use another length configuration of DL, GP and UL.

When a radio frame includes 2 or more enhanced subframes, enhanced subframes of different types (type 1 or type 2) may be simultaneously used.

A type 1 enhanced subframe may use the above different structural configurations, as shown in examples of FIG. 3A to FIG. 3C, but not limited to FIG. 3A to FIG. 3C.

A type 2 enhanced subframe may use the above different structural configurations, as shown in examples of FIG. 7 to FIG. 9, but not limited to FIG. 4A to FIG. 6C.

Figure 9A:
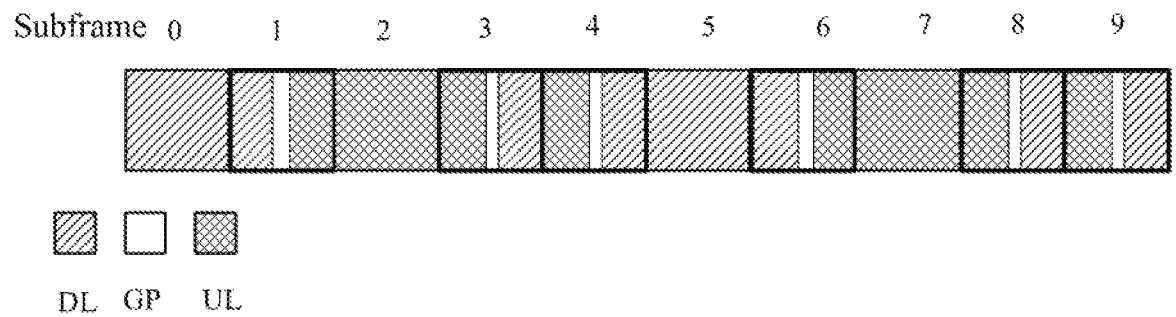
FIG. 9A is a schematic diagram of a first radio frame using enhanced subframes of two types in accordance with an embodiment of the invention.
Figure 9B:
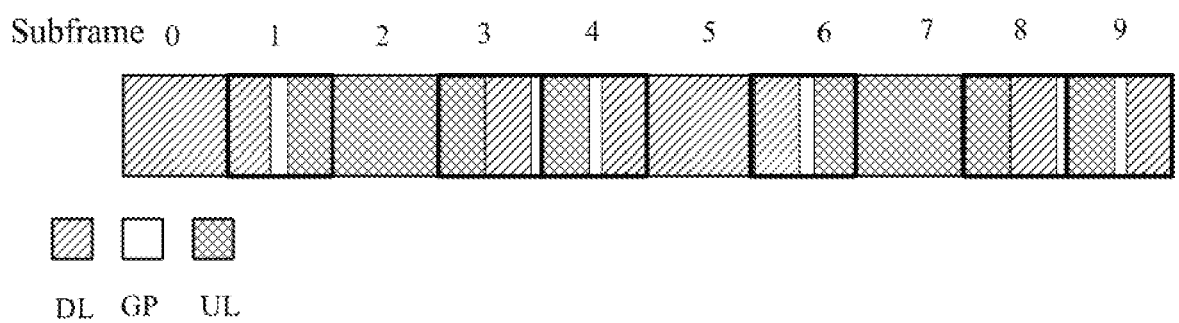
FIG. 9B is a schematic diagram of a second radio frame using enhanced subframes of two types in accordance with an embodiment of the invention.
Figure 9C:
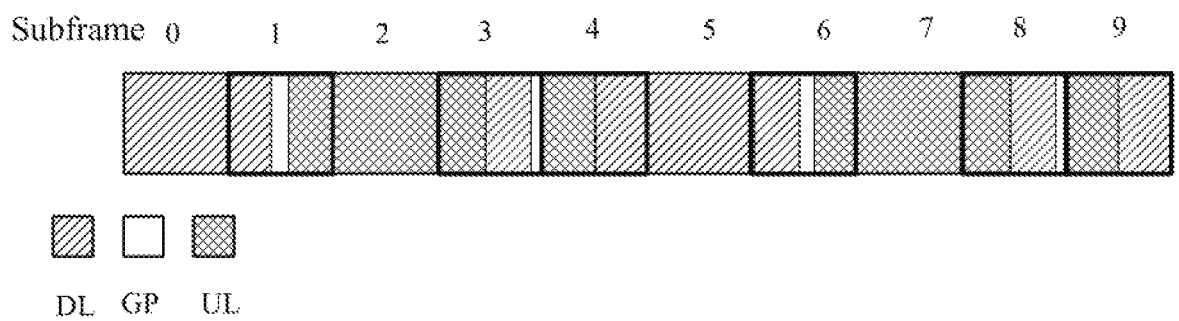
FIG. 9C is a schematic diagram of a third radio frame using enhanced subframes of two types in accordance with an embodiment of the invention.
Figure 9D:
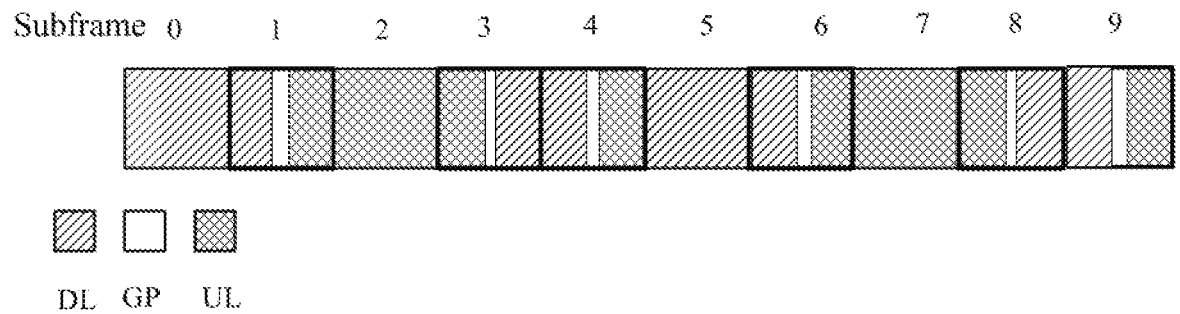
FIG. 9D is a schematic diagram of a fourth radio frame using enhanced subframes of two types in accordance with an embodiment of the invention.
Figure 9E:
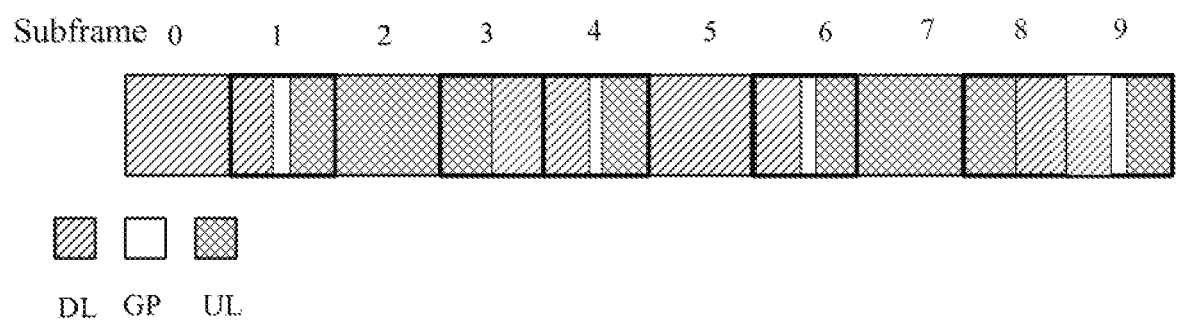
FIG. 9E is a schematic diagram of a fifth radio frame using enhanced subframes of two types in accordance with an embodiment of the invention.
Figure 9F:
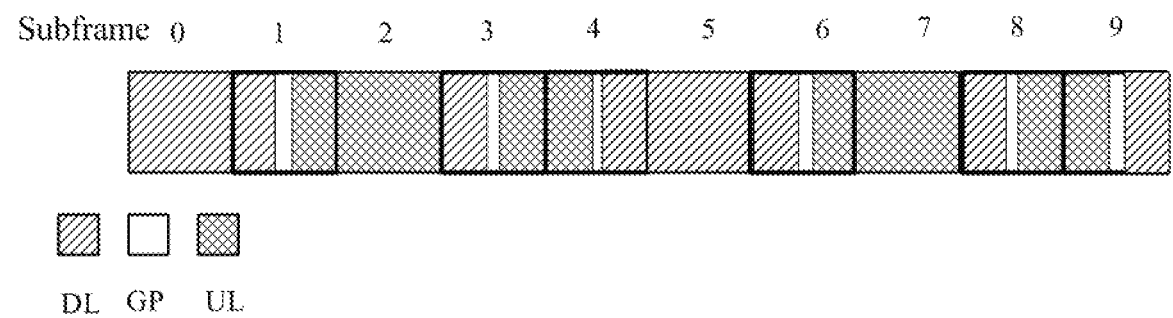
FIG. 9F is a schematic diagram of a sixth radio frame using enhanced subframes of two types in accordance with an embodiment of the invention.
Figure 9G:
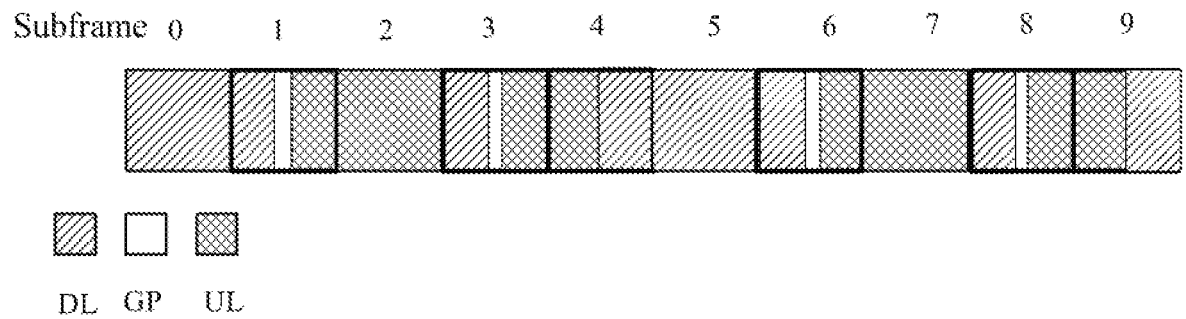
FIG. 9G is a schematic diagram of a seventh radio frame using enhanced subframes of two types in accordance with an embodiment of the invention.
Figure 9H:
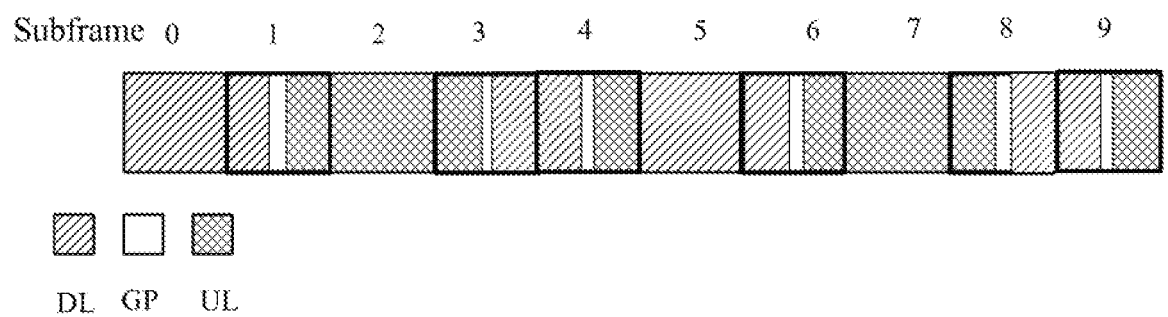
FIG. 9H is a schematic diagram of an eighth radio frame using enhanced subframes of two types in accordance with an embodiment of the invention.

FIG. 9A to FIG. 9H provide different embodiments of a radio frame using enhanced subframes of two types. In the examples of FIG. 9A to FIG. 9C, a subframe {1, 6} uses a type 1 enhanced subframe, and a subframe {3, 4, 8, 9} uses a type 2 enhanced subframe. In the examples of FIG. 9D to FIG. 9E, a subframe {1, 4, 6, 9} uses a type 1 enhanced subframe, and a subframe {3, 8} uses a type 2 enhanced subframe. In the examples of FIG. 9F to FIG. 9G a subframe {1, 3, 6, 8} uses a type 1 enhanced subframe, and a subframe {4, 9} uses a type 2 enhanced subframe. When enhanced subframes of two types are present in a radio frame, identical or different subframe structure configurations may be used between a plurality of enhanced subframes of a same type (referring to the lengths of DL, UL and/or GP portions in enhanced subframes). FIG. 9H gives an example, wherein a type 1 enhanced subframe {1, 6} uses a subframe structure configuration (DL>UL), while another type 1 enhanced subframe {1, 6} uses another subframe structure configuration (DL=UL). Other examples are similar and are not described in detail any more.

It should be noted that the above description is only illustrative, the embodiments of the invention are not limited to the above examples, and as long as enhanced subframes of two types are used in a radio frame, they are suitable for the embodiments of the invention.

Figure 10:
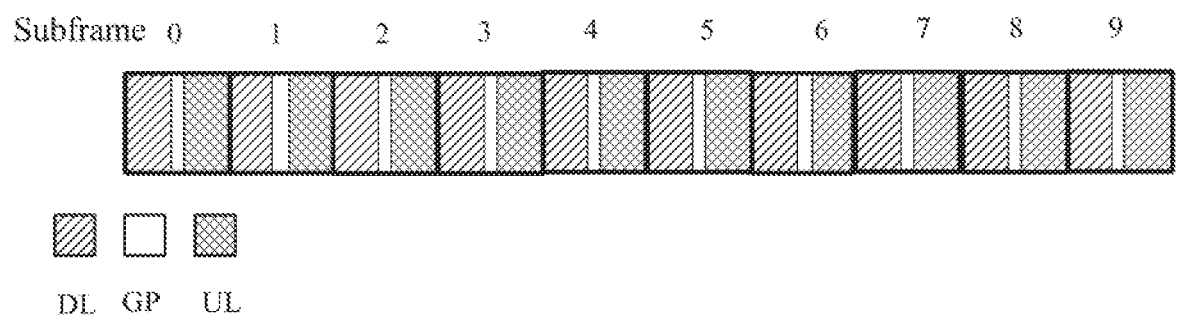
FIG. 10 is a schematic diagram of a radio frame only including an enhanced subframe in accordance with an embodiment of the invention.
Figure 11A:
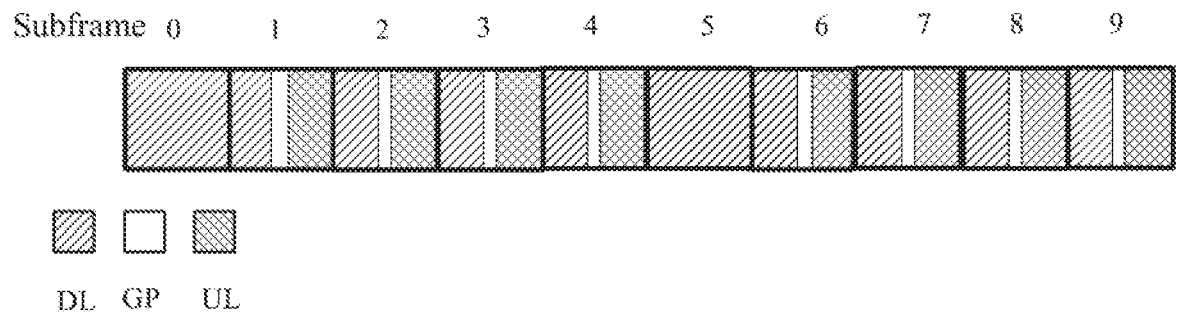
FIG. 11A is a schematic diagram of a radio frame only including an enhanced subframe and a downlink subframe in accordance with an embodiment of the invention.
Figure 11B:
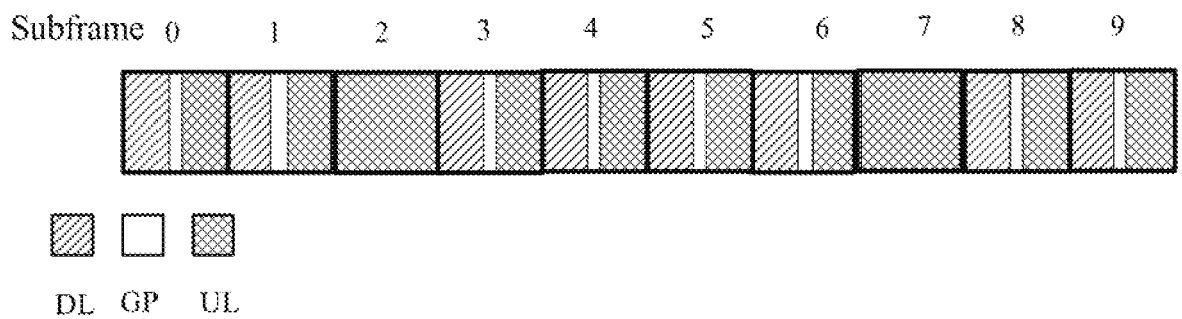
FIG. 11B is a schematic diagram of a radio frame only including an enhanced subframe and a downlink subframe in accordance with an embodiment of the invention.

In all above embodiments, a radio frame includes not only an enhanced subframe, but also a downlink subframe and an uplink subframe. In implementation of an embodiment of the invention, a frame structure may only include an enhanced subframe; or a radio frame includes not only an enhanced subframe, but also either a downlink subframe or an uplink subframe. FIG. 10 to FIG. 11B respectively give three embodiments.

The user plane delay is estimated below by taking a frame structure solution according to an embodiment of the invention applied in a TDD system as an example.

In a solution according to an embodiment of the invention, an enhanced subframe can transmit not only a downlink service, but also an uplink service, and a radio frame includes a plurality of enhanced subframes. Therefore, the solution of the present invention can provide more opportunities for transmitting downlink services and/or uplink services. Compared with the existing TD-LTD frame structure, the solution of the invention has a beneficial effect of reducing the user plane delay.

Figure 12A:
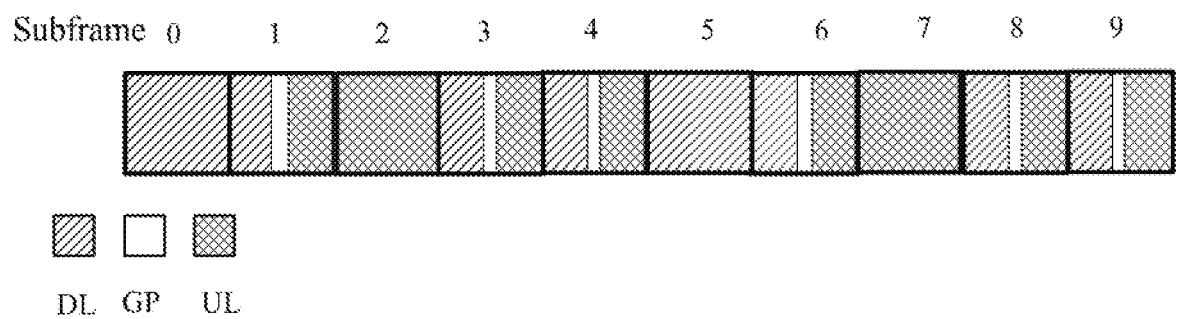
FIG. 12A is a schematic diagram of a frame structure in accordance with an embodiment of the invention.

Taking a frame structure shown in FIG. 12A as an example, assume that the length of each subframe is 1 ms, then the length of a TTI in which a downlink service or an uplink service is respectively transmitted in a complete downlink subframe or uplink subframe is 1 ms. Assume that in an enhanced subframe, the length of a DL portion is 0.45 ms, and the length of a UL portion is 0.45 ms, then the length of a TTI in which a downlink service or an uplink service is respectively transmitted in a DL portion or a UL portion of an enhanced subframe is 0.45 ms. Then assume that during downlink transmission, the processing time of 1 ms TTI data and 0.45 ms TTI data is respectively 1 ms and 0.5 ms before transmission by an eNB, and the corresponding processing time is respectively 1.5 ms and 1 ms during reception by a user equipment. During uplink transmission, the processing time of 1 ms TTI data and 0.45 ms TTI data is respectively 1 ms and 0.5 ms before transmission by a user equipment, and the corresponding processing time is respectively 1.5 ms and 1 ms during reception by an eNB.

Table 1 and Table 2 are estimate results of an uplink and a downlink U plane delay for an embodiment in FIG. 12A. It can be seen that when HARQ (Hybrid Automatic Repeat Request) retransmission is not considered, the average uplink and downlink U plane delays are respectively 2.8 ms and 3 ms in an embodiment of the frame structure, and are significantly reduced, compared with 4 ms user plane delay of an existing LTE-FDD system and compared with the user plane delay of an existing TDD system (see 3GPP TR36.912). Therefore, the TDD frame structure presented in an embodiment of the invention has a beneficial effect of reducing the user plane delay of a system.

subframe, the length of a DL portion and the length of a UL portion are equal, correspond to DL and UL TTI lengths, and are approximately 0.5 ms. Assume that during downlink transmission, the processing time of 0.5 ms TTI is respectively 0.5 ms before transmission by an eNB, and the corresponding processing time is 1 ms during reception by a user equipment; and during uplink transmission, the processing time of 0.5 ms TTI data is respectively 0.5 ms before transmission by a user equipment, and the corresponding processing time is 1 ms during reception by an eNB.

Figure 12B:
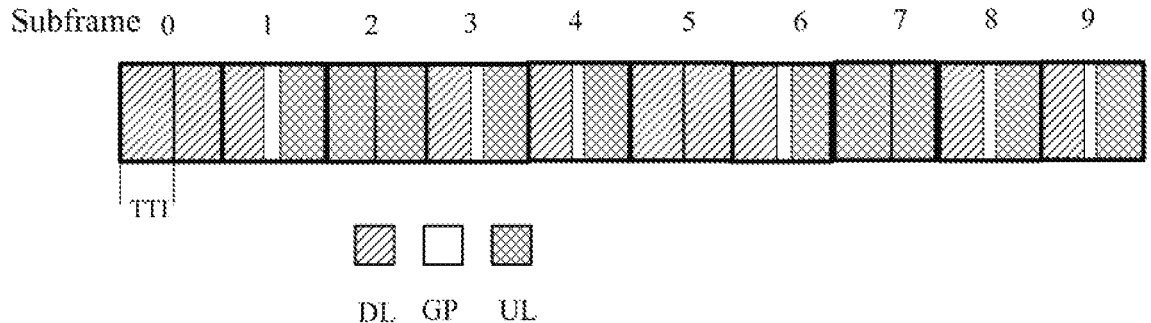
FIG. 12B is a schematic diagram of a frame structure using a short TTI in accordance with an embodiment of the invention.

Table 3 and Table 4 are estimate results of an uplink and a downlink U plane delay for an embodiment in FIG. 12B. It can be seen that when HARQ retransmission is not considered, the average uplink and downlink U plane delays

TABLE 1

Estimate of an uplink U plane delay using an embodiment of a frame structure in FIG. 12A according to an embodiment of the invention (without considering HARQ retransmission)

| Step | Description | Subframe index | | | | | | | | | |
|---|---|---|---|---|---|---|---|---|---|---|---|
| | | 0 | 1 | 2 | 3 | 4 | 5 | 6 | 7 | 8 | 9 |
| 1 | UE Processing Delay (ms) | 0.5 | 0.75 | 0.5 | 0.5 | 0.5 | 0.5 | 0.75 | 0.5 | 0.5 | 0.5 |
| 2 | Frame Alignment (ms) | 0.75 | 0.25 | 0.75 | 0.5 | 1 | 0.75 | 0.25 | 0.75 | 0.5 | 1 |
| 3 | TTI duration (ms) | 0.5 | 0.75 | 0.5 | 0.5 | 0.5 | 0.5 | 0.75 | 0.5 | 0.5 | 0.5 |
| 4 | eNB Processing Delay (ms) | 1 | 1.25 | 1 | 1 | 1 | 1 | 1.25 | 1 | 1 | 1 |
| 5 | one way delay (ms) | 2.75 | 3 | 2.75 | 2.5 | 3 | 2.75 | 3 | 2.75 | 2.5 | 3 |
| | Average one way delay (ms) | | | | | 2.8 | | | | | |

TABLE 2

Estimate of a downlink U plane delay using an embodiment of a frame structure in FIG. 12A according to an embodiment of the invention (without considering HARQ retransmission)

| Step | Description | Subframe index | | | | | | | | | |
|---|---|---|---|---|---|---|---|---|---|---|---|
| | | 0 | 1 | 2 | 3 | 4 | 5 | 6 | 7 | 8 | 9 |
| 1 | eNB Processing Delay (ms) | 0.5 | 0.5 | 0.5 | 0.5 | 1 | 0.5 | 0.5 | 0.5 | 0.5 | 1 |
| 2 | Frame Alignment (ms) | 0.5 | 1.5 | 0.5 | 0.5 | 0.5 | 0.5 | 1.5 | 0.5 | 0.5 | 0.5 |
| 3 | TTI duration (ms) | 0.5 | 0.5 | 0.5 | 0.5 | 1 | 0.5 | 0.5 | 0.5 | 0.5 | 1 |
| 4 | UE Processing Delay (ms) | 1 | 1 | 1 | 1 | 1.5 | 1 | 1 | 1 | 1 | 1.5 |
| 5 | one way delay (ms) | 2.5 | 3.5 | 2.5 | 2.5 | 4 | 2.5 | 3.5 | 2.5 | 2.5 | 4 |
| | Average one way delay (ms) | | | | | 3 | | | | | |

In another embodiment of the invention, a downlink subframe and an uplink subframe of a radio frame are respectively divided into 2 slots, and the lengths of a downlink TTI and an uplink TTI are defined to be equal to the slots. In an example shown in FIG. 12B, the length of each subframe is 1 ms, the length of each TTI is 0.5 ms, and two TTIs are transmitted in one subframe. In an enhanced are respectively 2.6 ms and 2.75 ms in an embodiment of the frame structure, and are significantly reduced, compared with 4 ms user plane delay of an existing LTE-FDD system and compared with the user plane delay of an existing TDD system. Therefore, the TDD frame structure presented in the present invention has a beneficial effect of reducing the user plane delay of a system.

TABLE 3

Estimate of an uplink U plane delay using an embodiment of a frame structure in FIG. 12B according to an embodiment of the invention (without considering HARQ retransmission)

| Step | Description | Subframe index | | | | | | | | | |
|---|---|---|---|---|---|---|---|---|---|---|---|
| | | 0 | 1 | 2 | 3 | 4 | 5 | 6 | 7 | 8 | 9 |
| 1 | UE Processing Delay (ms) | 0.5 | 0.5 | 0.5 | 0.5 | 0.5 | 0.5 | 0.5 | 0.5 | 0.5 | 0.5 |
| 2 | Frame Alignment (ms) | 0.75 | 0.25 | 0.5 | 0.5 | 1 | 0.75 | 0.25 | 0.5 | 0.5 | 1 |
| 3 | TTI duration (ms) | 0.5 | 0.5 | 0.5 | 0.5 | 0.5 | 0.5 | 0.5 | 0.5 | 0.5 | 0.5 |
| 4 | eNB Processing Delay (ms) | 1 | 1 | 1 | 1 | 1 | 1 | 1 | 1 | 1 | 1 |
| 5 | one way delay (ms) | 2.75 | 2.25 | 2.5 | 2.5 | 3 | 2.75 | 2.25 | 2.5 | 2.5 | 3 |
| | Average one way delay (ms) | | | | | 2.6 | | | | | |

TABLE 4

Estimate of a downlink U plane delay using an embodiment of a frame structure in FIG. 12B according to an embodiment of the invention (without considering HARQ retransmission)

| Step | Description | Subframe index | | | | | | | | | |
|---|---|---|---|---|---|---|---|---|---|---|---|
| | | 0 | 1 | 2 | 3 | 4 | 5 | 6 | 7 | 8 | 9 |
| 1 | eNB Processing Delay (ms) | 0.5 | 0.5 | 0.5 | 0.5 | 0.5 | 0.5 | 0.5 | 0.5 | 0.5 | 0.5 |
| 2 | Frame Alignment (ms) | 0.25 | 1.5 | 0.5 | 0.5 | 0.5 | 0.25 | 1.5 | 0.5 | 0.5 | 0.5 |
| 3 | TTI duration (ms) | 0.5 | 0.5 | 0.5 | 0.5 | 1 | 0.5 | 0.5 | 0.5 | 0.5 | 1 |
| 4 | UE Processing Delay (ms) | 1 | 1 | 1 | 1 | 1 | 1 | 1 | 1 | 1 | 1 |
| 5 | one way delay (ms) | 2.25 | 3.5 | 2.5 | 2.5 | 3 | 2.25 | 3.5 | 2.5 | 2.5 | 3 |
| | Average one way delay (ms) | | | | | | 2.75 | | | | |

A technical solution according to an embodiment of the invention can not only reduce the user plane delay, but also maintain the backward compatibility. The backward compatibility means that a carrier with a frame structure in the invention in an LTE-TDD system can access to not only an enhanced LTE-TDD user equipment (e.g. 3GPP LTE Rel-14 user equipment) supporting a solution of the invention, but also a low version LTE-TDD user equipment (e.g. a user equipment prior to 3GPP LTE Rel-13). The specific method includes configuring much uplink UL-DL configuration A on an old version LTE-TDD user equipment, configuring an enhanced subframe presented in the invention only on some uplink subframes of A, and configuring UL-DL configuration B corresponding to the result on an enhanced LTE-TDD user equipment.

Figure 13:
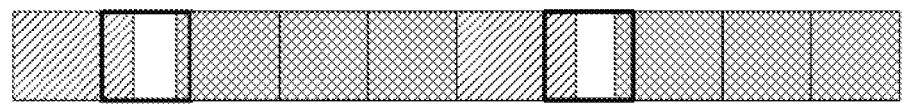
FIG. 13 is a schematic diagram of maintaining backward compatibility in accordance with an embodiment of the invention.
Figure 13:
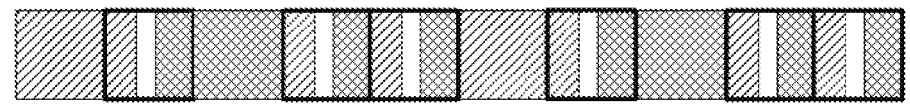

FIG. 13 provides an example, wherein a network configures an existing UL-DL configuration #0 and an existing special subframe configuration on a low version LTE-TDD user equipment, configures an enhanced subframe on a subframe {3, 4, 8, 9} of a radio frame, and configures a corresponding frame structure on an enhanced LTE-TDD user equipment. In this example, the network schedules a low version LTE-TDD user equipment only in a subframe {0, 1, 2, 5, 6, 7}, and can schedule an enhanced LTE-TDD user equipment in all subframes.

The above contents are respectively introduced according to each technical feature and embodiments thereof. During implementation of this solution, the two or more than two technical features (or embodiments including the technical features) may be combined in any way, and the combined frame structure solutions and corresponding embodiments also fall within the scope of protection of the present invention.

In the description of the above technical solutions, one radio frame is used as a unit for description. During implementation of a solution provided in an embodiment of the invention, use of other time period as a unit is not excluded. For example, subframe type and structure are configured with a half radio frame, a plurality of radio frames or any time as a unit, and the frame structure solutions thus obtained and corresponding embodiments also fall within the scope of protection of the invention.

A solution provided in an embodiment of the invention is not limited to a subframe length in a system, 1 ms subframe structure identical to an existing LTE system may be used, and a shorter subframe length, e.g. 0.2 ms, may also be used as required. After using a shorter subframe length, the solution provided in an embodiment of the invention will have a lower user plane delay.

Figure 14:
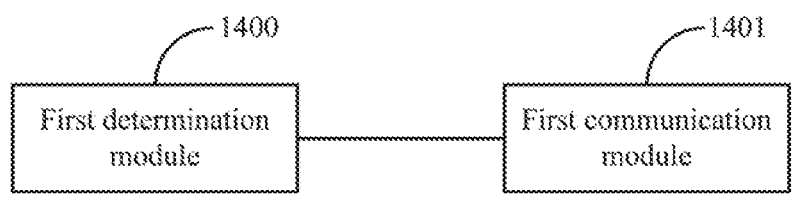
FIG. 14 is a structural diagram of a first network side device in a system for transmitting data in accordance with an embodiment of the invention.

As shown in FIG. 14, a first network side device in a system for transmitting data according to an embodiment of the invention includes:

a first determination module 1400, configured for determining a radio frame, wherein the radio frame includes an enhanced subframe, and the enhanced subframe includes an UL portion and a DL portion; and a first communication module 1401, configured for communicating with a user equipment through the radio frame.

Optionally, the first communication module 1401 is configured for:

receiving a part of or all of uplink pilot, uplink service data and uplink control signaling through the UL portion in the enhanced subframe; and/or, transmitting a part of or all of downlink pilot, downlink service data and downlink control signaling through the DL portion in the enhanced subframe.

Optionally, the first determination module 1400 is configured for:

determining the length of the UL portion and the length of the DL portion in the enhanced subframe;

wherein, the length of the UL portion is equal to or different from the length of the DL portion in the enhanced subframe.

Optionally, the enhanced subframe in the radio frame includes an enhanced subframe of a first type and/or an enhanced subframe of a second type;

wherein, the DL portion is prior to the UL portion in the enhanced subframe of the first type; and the UL portion is prior to the DL portion in the enhanced subframe of the second type.

Optionally, the UL portion in the enhanced subframe includes N OFDM symbols, where N is a positive integer; and the DL portion in the enhanced subframe includes M OFDM symbols, where M is a positive integer.

Optionally, M is equal to N.

Optionally, the length of the UL portion in different enhanced subframes of the radio frame is equal or different.

Optionally, the length of the DL portion in different enhanced subframes of the radio frame is equal or different.

Optionally, the enhanced subframe further includes a guard period GP portion.

Optionally, the GP portion in the enhanced subframe is between the DL portion and the UL portion; or the GP portion in the enhanced subframe is at the end of the enhanced subframe; or the GP portion in the enhanced subframe is at the beginning of the enhanced subframe.

Optionally, the radio frame includes at least one enhanced subframe with the GP portion and at least one enhanced subframe without the GP portion; or the radio frame includes at least one enhanced subframe, all of which have GP portion; or the radio frame includes at least one enhanced subframe, none of which has the GP portion.

Optionally, in a plurality of the enhanced subframes with GP portions in the radio frame, the positions of the GP portions in their respective enhanced subframes are completely identical or partially identical or completely different.

Optionally, the length of a downlink TTI of the enhanced subframe is less than the length of one subframe; and/or the length of an uplink TTI of the enhanced subframe is less than the length of one subframe.

Optionally, the length of a downlink TTI of the enhanced subframe is equal to the length of half a subframe; or the length of a downlink TTI of the enhanced subframe is equal to the length of the DL portion in the enhanced subframe; and/or the length of an uplink TTI of the enhanced subframe is equal to the length of half a subframe; or the length of an uplink TTI of the enhanced subframe is equal to the length of the UL portion in the enhanced subframe.

Optionally, the radio frame further includes at least one downlink subframe and/or at least one uplink subframe.

Optionally, the length of a downlink TTI of the downlink subframe is equal to or less than the length of one subframe; and/or the length of an uplink TTI of the uplink subframe is equal to or less than the length of one subframe.

Optionally, the first communication module is further configured for radio frame configuration of the user equipment.

Figure 15:
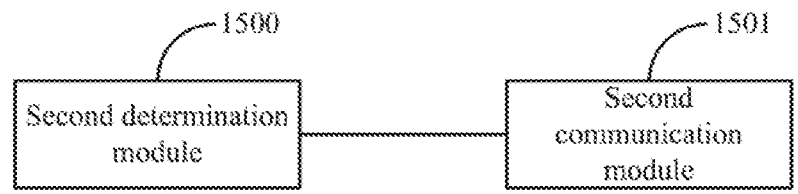
FIG. 15 is a structural diagram of a first user equipment in a system for transmitting data in accordance with an embodiment of the invention.

As shown in FIG. 15, a first user equipment in a system for transmitting data according to an embodiment of the invention includes:

a second determination module 1500, configured for determining a radio frame, wherein the radio frame includes an enhanced subframe, and the enhanced subframe includes a UL portion and a DL portion; and a second communication module 1501, configured for communicating with a network side device through the radio frame.

Optionally, the second communication module 1501 is configured for:

transmitting a part of or all of uplink pilot, uplink service data and uplink control signaling through the UL portion in the enhanced subframe; and/or, receiving a part of or all of downlink pilot, downlink service data and downlink control signaling through the DL portion in the enhanced subframe.

Optionally, the second determination module 1500 is configured for:

determining the length of the UL portion and the length of the DL portion in the enhanced subframe;

wherein, the length of the UL portion is equal to or different from the length of the DL portion in the enhanced subframe.

Optionally, the enhanced subframe in the radio frame includes an enhanced subframe of a first type and/or an enhanced subframe of a second type;

wherein, the DL portion is prior to the UL portion in the enhanced subframe of the first type; and the UL portion is prior to the DL portion in the enhanced subframe of the second type.

Optionally, the UL portion in the enhanced subframe includes N OFDM symbols, where N is a positive integer; and the DL portion in the enhanced subframe includes M OFDM symbols, where M is a positive integer.

Optionally, M is equal to N.

Optionally, the length of the UL portion in different enhanced subframes of the radio frame is equal or different.

Optionally, the length of the DL portion in different enhanced subframes of the radio frame is equal or different.

Optionally, the enhanced subframe further includes a guard period GP portion.

Optionally, a GP portion in the enhanced subframe is between the DL portion and the UL portion; or a GP portion in the enhanced subframe is at the end of the enhanced subframe; or a GP portion in the enhanced subframe is at the beginning of the enhanced subframe.

Optionally, the radio frame includes at least one enhanced subframe with the GP portion and at least one enhanced subframe without the GP portion; or the radio frame includes at least one enhanced subframe, all of which have the GP portion; or the radio frame includes at least one enhanced subframe, none of which has the GP portion.

Optionally, in a plurality of the enhanced subframes with GP portions in the radio frame, the positions of the GP portions in their respective enhanced subframes are completely identical or partially identical or completely different.

Optionally, the length of a downlink TTI of the enhanced subframe is less than the length of one subframe; and/or the length of an uplink TTI of the enhanced subframe is less than the length of one subframe.

Optionally, the length of a downlink TTI of the enhanced subframe is equal to the length of half a subframe; or the length of a downlink TTI of the enhanced subframe is equal to the length of the DL portion in the enhanced subframe; and/or the length of an uplink TTI of the enhanced subframe is equal to the length of half a subframe; or the length of an uplink TTI of the enhanced subframe is equal to the length of the UL portion in the enhanced subframe.

Optionally, the radio frame further includes at least one downlink subframe and/or at least one uplink subframe.

Optionally, the length of a downlink TTI of the downlink subframe is equal to or less than the length of one subframe; and/or the length of an uplink TTI of the uplink subframe is equal to or less than the length of one subframe.

Optionally, the user equipment determines the radio frame, including:

the user equipment determining the radio frame according to the configuration of a network side device.

Figure 16:
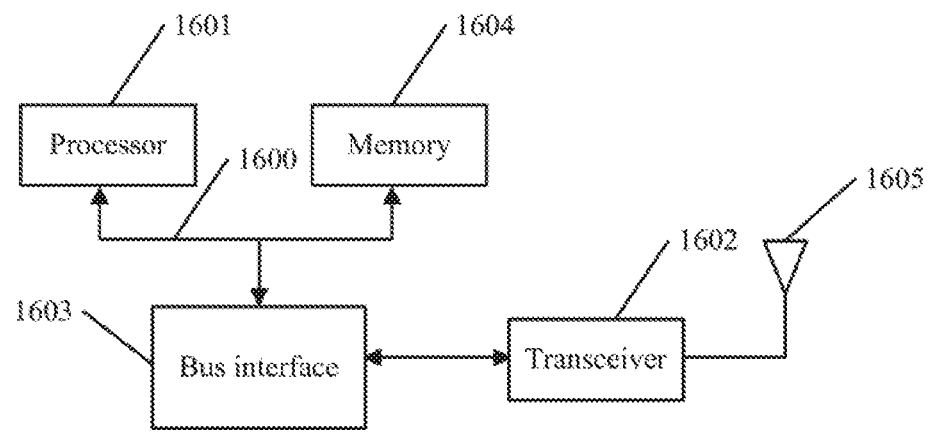
FIG. 16 is a structural diagram of a second network side device in a system for transmitting data in accordance with an embodiment of the invention.

As shown in FIG. 16, a second network side device in a system for transmitting data according to an embodiment of the invention includes:

a processor 1601, configured for reading programs in a memory 1604 and executing the following processes;

determining a radio frame, wherein the radio frame includes an enhanced subframe, and the enhanced subframe includes a UL portion and a DL portion; and controlling a transceiver 1602 to communicate with a user equipment through the radio frame, the transceiver 1602, configured for receiving and transmitting data under the control of the processor 1601.

Optionally, the processor 1601 is configured for:

receiving a part of or all of uplink pilot, uplink service data and uplink control signaling through the UL portion in the enhanced subframe; and/or, transmitting a part of or all of downlink pilot, downlink service data and downlink control signaling through the DL portion in the enhanced subframe.

Optionally, the processor 1601 is configured for:

determining the length of the UL portion and the length of the DL portion in the enhanced subframe;

wherein, the length of the UL portion is equal to or different from the length of the DL portion in the enhanced subframe.

Optionally, the enhanced subframe in the radio frame includes an enhanced subframe of a first type and/or an enhanced subframe of a second type;

wherein, the DL portion is prior to the UL portion in the enhanced subframe of the first type; and the UL portion is prior to the DL portion in the enhanced subframe of the second type.

Optionally, the UL portion in the enhanced subframe includes N OFDM symbols, where N is a positive integer; and the DL portion in the enhanced subframe includes M OFDM symbols, where M is a positive integer.

Optionally, M is equal to N.

Optionally, the length of the UL portion in different enhanced subframes of the radio frame is equal or different.

Optionally, the length of the DL portion in different enhanced subframes of the radio frame is equal or different.

Optionally, the enhanced subframe further includes a guard period GP portion.

Optionally, the GP portion in the enhanced subframe is between the DL portion and the UL portion; or the GP portion in the enhanced subframe is at the end of the enhanced subframe; or the GP portion in the enhanced subframe is at the beginning of the enhanced subframe.

Optionally, the radio frame includes at least one enhanced subframe with the GP portion and at least one enhanced subframe without the GP portion; or the radio frame includes at least one enhanced subframe, all of which have GP portion; or the radio frame includes at least one enhanced subframe, none of which has the GP portion.

Optionally, in a plurality of the enhanced subframes with GP portions in the radio frame, the positions of the GP portions in their respective enhanced subframes are completely identical or partially identical or completely different.

Optionally, the length of a downlink TTI of the enhanced subframe is less than the length of one subframe; and/or the length of an uplink TTI of the enhanced subframe is less than the length of one subframe.

Optionally, the length of a downlink TTI of the enhanced subframe is equal to the length of half a subframe; or the length of a downlink TTI of the enhanced subframe is equal to the length of the DL portion in the enhanced subframe; and/or the length of an uplink TTI of the enhanced subframe is equal to the length of half a subframe; or the length of an uplink TTI of the enhanced subframe is equal to the length of the UL portion in the enhanced subframe.

Optionally, the radio frame further includes at least one downlink subframe and/or at least one uplink subframe.

Optionally, the length of a downlink TTI of the downlink subframe is equal to or less than the length of one subframe; and/or the length of an uplink TTI of the uplink subframe is equal to or less than the length of one subframe.

Optionally, the first communication module is further configured for: configuring the radio frame for the user equipment.

In a bus architecture (represented by a bus 1600) of FIG. 16, the bus 1600 may include any number of interconnected buses and bridges, and links various circuits including one or more processors represented by a processor 1601 and memories represented by a memory 1604 together. The bus 1600 can further link a variety of other circuits, such as peripheral equipment, a voltage regulator and a power management circuit, together, all of which are well known in this field, and are not further described any more herein. The bus interface 1603 provides an interface between the bus 1600 and a transceiver 1602. The transceiver 1602 may be one element or a plurality of elements, e.g. a plurality of receivers and transmitters, and provides units for communicating with various other devices on the transmission medium. Data processed by the processor 1601 are transmitted over a radio medium by an antenna 1605. Furthermore, the antenna 1605 further receives data and transmits the data to the processor 1601.

The processor 1601 is responsible for managing the bus 1600 and regular processing, and can also provide various functions, including timing, peripheral interfaces, voltage regulation, power management, and other control functions. The memory 1604 can be configured for storing data used by the processor 1601 when executing an operation.

Optionally, the processor 1601 may be a CPU (central processing unit), an ASIC (Application Specific Integrated Circuit), a FPGA (Field-Programmable Gate Array) or a CPLD (Complex Programmable Logic Device).

Figure 17:
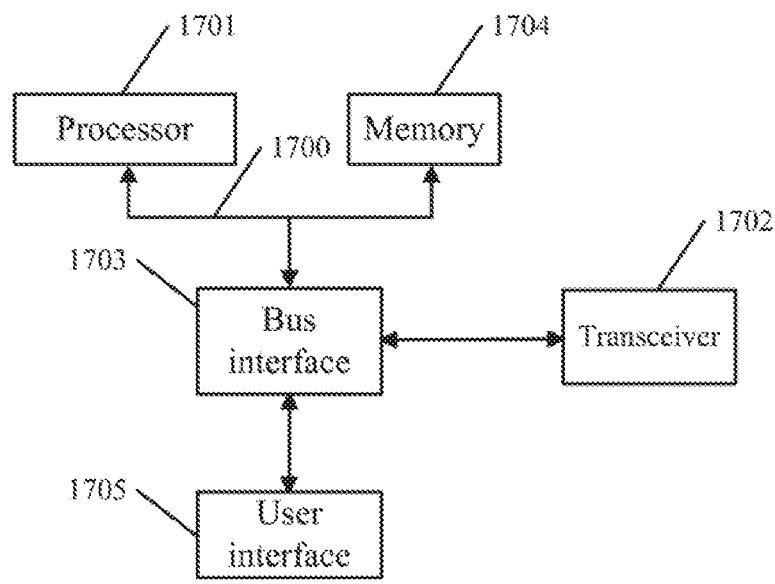
FIG. 17 is a structural diagram of a second user equipment in a system for transmitting data in accordance with an embodiment of the invention.

As shown in FIG. 17, a second user equipment in a system for transmitting data according to an embodiment of the invention includes:

a processor 1701, configured for reading programs in a memory 1704 and executing the following processes:

determining a radio frame, wherein the radio frame includes an enhanced subframe, and the enhanced subframe includes a UL portion and a DL portion; and controlling a transceiver 1702 to communicate with a network side device through the radio frame, the transceiver 1702, configured for receiving and transmitting data under the control of the processor 1701.

Optionally, the processor 1701 is configured for:

transmitting a part of or all of uplink pilot, uplink service data and uplink control signaling through the UL portion in the enhanced subframe; and/or, receiving a part of or all of downlink pilot, downlink service data and downlink control signaling through the DL portion in the enhanced subframe.

Optionally, the processor 1701 is configured for:

determining the length of the UL portion and the length of the DL portion in the enhanced subframe;

wherein, the length of the UL portion is equal to or different from the length of the DL portion in the enhanced subframe.

Optionally, the enhanced subframe in the radio frame includes an enhanced subframe of a first type and/or an enhanced subframe of a second type;

wherein, the DL portion is prior to the UL portion in the enhanced subframe of the first type; and the UL portion is prior to the DL portion in the enhanced subframe of the second type.

Optionally, the UL portion in the enhanced subframe includes N OFDM symbols, where N is a positive integer; and the DL portion in the enhanced subframe includes M OFDM symbols, where M is a positive integer.

Optionally, M is equal to N.

Optionally, the length of the UL portion in different enhanced subframes of the radio frame is equal or different.

Optionally, the length of the DL portion in different enhanced subframes of the radio frame is equal or different.

Optionally, the enhanced subframe further includes a guard period GP portion.

Optionally, the GP portion in the enhanced subframe is between the DL portion and the UL portion; or the GP portion in the enhanced subframe is at the end of the enhanced subframe; or the GP portion in the enhanced subframe is at the beginning of the enhanced subframe.

Optionally, the radio frame includes at least one enhanced subframe with the GP portion and at least one enhanced subframe without the GP portion; or the radio frame includes at least one enhanced subframe, all of which have the GP portion; or the radio frame includes at least one enhanced subframe, none of which has the GP portion.

Optionally, in a plurality of the enhanced subframes with GP portions in the radio frame, the positions of the GP portions in their respective enhanced subframes are completely identical or partially identical or completely different.

Optionally, the length of a downlink TTI of the enhanced subframe is less than the length of one subframe; and/or the length of an uplink TTI of the enhanced subframe is less than the length of one subframe.

Optionally, the length of a downlink TTI of the enhanced subframe is equal to the length of half a subframe; or the length of a downlink TTI of the enhanced subframe is equal to the length of the DL portion in the enhanced subframe; and/or the length of an uplink TTI of the enhanced subframe is equal to the length of half a subframe; or the length of an uplink TTI of the enhanced subframe is equal to the length of the UL portion in the enhanced subframe.

Optionally, the radio frame further includes at least one downlink subframe and/or at least one uplink subframe.

Optionally, the length of a downlink TTI of the downlink subframe is equal to or less than the length of one subframe; and/or the length of an uplink TTI of the uplink subframe is equal to or less than the length of one subframe.

Optionally, the user equipment determines the radio frame, including:

the user equipment determining the radio frame according to the configuration of a network side device.

In a bus architecture (represented by a bus 1700) of FIG. 17, the bus 1700 may include any number of interconnected buses and bridges, and links various circuits including one or more processors represented by a processor 1701 and memories represented by a memory 1704 together. The bus 1700 can further link a variety of other circuits, such as peripheral equipment, a voltage regulator and a power management circuit together, all of which are well known in this field, and are not further described any more herein. The bus interface 1703 provides an interface between the bus 1700 and a transceiver 1702. The transceiver 1702 may be one element or a plurality of elements, e.g. a plurality of receivers and transmitters, and provides units for communicating with various other devices on the transmission medium. For example, the transceiver 1702 receives external data from other devices. The transceiver 1702 is used for transmitting data processed by the processor 1701 to other devices. Depending on the properties of a computing system, a user interface 1705 may be further provided, e.g. a keypad, a displayer, a loudspeaker, a microphone, or a joy stick.

The processor 1701 is responsible for managing the bus 1700 and regular processing, e.g. the foregoing operating a usual operating system. The memory 1704 can be configured for storing data used by the processor 1701 when executing an operation.

Optionally, the processor 1701 may be a CPU, an ASIC, a FPGA or a CPLD.

Based on the same inventive concept, an embodiment of the present invention further provides a first method for transmitting data. Because the device corresponding to this method is a network side device in a system for transmitting data according to an embodiment of the present invention, and the problem solving principle of the method is similar to the device, the implementation of the device can be referred to for the implementation of this method, and the repetition is not described in detail any more.

Figure 18:
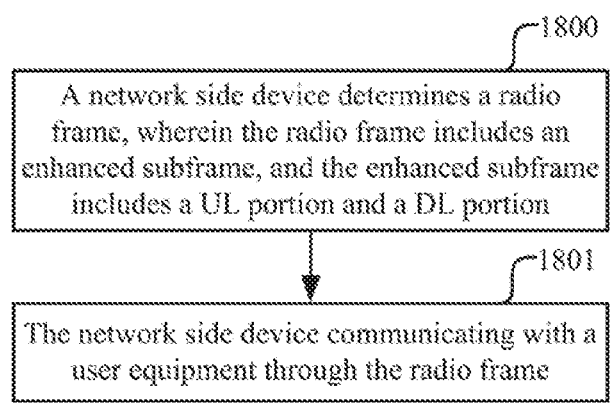
FIG. 18 is a process diagram of a first method for transmitting data in a system for transmitting data in accordance with an embodiment of the invention.

As shown in FIG. 18, a first method for transmitting data in a system for transmitting data according to an embodiment of the invention includes the following steps:

Step 1800: a network side device determines a radio frame, wherein the radio frame includes an enhanced subframe, and the enhanced subframe includes a UL portion and a DL portion.

Step 1801: the network side device communicates with a user equipment through the radio frame.

Optionally, the network side device communicates with the user equipment through the radio frame, including:

the network side device receiving a part of or all of uplink pilot, uplink service data and uplink control signaling through the UL portion in the enhanced subframe; and/or, the network side device transmitting a part of or all of downlink pilot, downlink service data and downlink control signaling through the DL portion in the enhanced subframe.

Optionally, the network side device determines the radio frame, including:

the network side device determining the length of the UL portion and the length of the DL portion in the enhanced subframe;

wherein, the length of the UL portion is equal to or different from the length of the DL portion in the enhanced subframe.

Optionally, the enhanced subframe in the radio frame includes an enhanced subframe of a first type and/or an enhanced subframe of a second type;

wherein, the DL portion is prior to the UL portion in the enhanced subframe of the first type; and the UL portion is prior to the DL portion in the enhanced subframe of the second type.

Optionally, the UL portion in the enhanced subframe includes N OFDM symbols, where N is a positive integer; and the DL portion in the enhanced subframe includes M OFDM symbols, where M is a positive integer.

Optionally, M is equal to N.

Optionally, the length of the UL portion in different enhanced subframes of the radio frame is equal or different.

Optionally, the length of the DL portion in different enhanced subframes of the radio frame is equal or different.

Optionally, the enhanced subframe further includes a guard period GP portion.

Optionally, the GP portion in the enhanced subframe is between the DL portion and the UL portion; or the GP portion in the enhanced subframe is at the end of the enhanced subframe; or the GP portion in the enhanced subframe is at the beginning of the enhanced subframe.

Optionally, the radio frame includes at least one enhanced subframe with the GP portion and at least one enhanced subframe without the GP portion; or the radio frame includes at least one enhanced subframe, all of which have the GP portion; or the radio frame includes at least one enhanced subframe, none of which has the GP portion.

Optionally, in a plurality of the enhanced subframes with GP portions in the radio frame, the positions of the GP portions in their respective enhanced subframes are completely identical or partially identical or completely different.

Optionally, the length of a downlink TTI of the enhanced subframe is less than the length of one subframe; and/or the length of an uplink TTI of the enhanced subframe is less than the length of one subframe.

Optionally, the length of a downlink TTI of the enhanced subframe is equal to the length of half a subframe; or the length of a downlink TTI of the enhanced subframe is equal to the length of the DL portion in the enhanced subframe; and/or, the length of an uplink TTI of the enhanced subframe is equal to the length of half a subframe; or the length of an uplink TTI of the enhanced subframe is equal to the length of the UL portion in the enhanced subframe.

Optionally, the radio frame further includes at least one downlink subframe and/or at least one uplink subframe.

Optionally, the length of a downlink TTI of the downlink subframe is equal to or less than the length of one subframe; and/or the length of an uplink TTI of the uplink subframe is equal to or less than the length of one subframe.

Optionally, the method further includes:

the network side device configuring the radio frame for the user equipment.

Based on the same inventive concept, an embodiment of the invention further provides a second method for transmitting data. Because the device corresponding to this method is a user equipment in a system for transmitting data according to an embodiment of the invention, and the problem solving principle of the method is similar to the device, the implementation of the device can be referred to for the implementation of this method, and the repetition is not described in detail any more.

Figure 19:
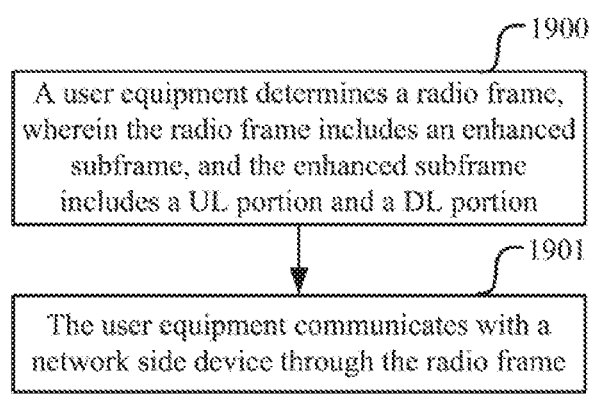
FIG. 19 is a process diagram of a second method for transmitting data in a system for transmitting data in accordance with an embodiment of the invention.

As shown in FIG. 19, a second method for transmitting data in a system for transmitting data according to an embodiment of the invention includes the following steps.

Step 1900: a user equipment determines a radio frame, wherein the radio frame includes an enhanced subframe, and the enhanced subframe includes a UL portion and a DL portion.

Step 1901: the user equipment communicates with a network side device through the radio frame.

Optionally, the user equipment communicates with the network side device through the radio frame, including:

the user equipment transmitting a part of or all of uplink pilot, uplink service data and uplink control signaling through the UL portion in the enhanced subframe; and/or, the user equipment receiving a part of or all of downlink pilot, downlink service data and downlink control signaling through the DL portion in the enhanced subframe.

Optionally, the user equipment determines the radio frame, including:

the user equipment determining the length of the UL portion and the length of the DL portion in the enhanced subframe;

wherein, the length of the UL portion is equal to or different from the length of the DL portion in the enhanced subframe.

Optionally, the enhanced subframe in the radio frame includes an enhanced subframe of a first type and/or an enhanced subframe of a second type;

wherein, the DL portion is prior to the UL portion in the enhanced subframe of the first type; and the UL portion is prior to the DL portion in the enhanced subframe of the second type.

Optionally, the UL portion in the enhanced subframe includes N OFDM symbols, where N is a positive integer; and the DL portion in the enhanced subframe includes M OFDM symbols, where M is a positive integer.

Optionally, M is equal to N.

Optionally, the length of the UL portion in different enhanced subframes of the radio frame is equal or different.

Optionally, the length of the DL portion in different enhanced subframes of the radio frame is equal or different.

Optionally, the enhanced subframe further includes a guard period GP portion.

Optionally, the GP portion in the enhanced subframe is between the DL portion and the UL portion; or the GP portion in the enhanced subframe is at the end of the enhanced subframe; or the GP portion in the enhanced subframe is at the beginning of the enhanced subframe.

Optionally, the radio frame includes at least one enhanced subframe with the GP portion and at least one enhanced subframe without the GP portion; or the radio frame includes at least one enhanced subframe, all of which have the GP portion; or the radio frame includes at least one enhanced subframe, none of which has the GP portion.

Optionally, in a plurality of the enhanced subframes with GP portions in the radio frame, the positions of the GP portions in their respective enhanced subframes are completely identical or partially identical or completely different.

Optionally, the length of a downlink TTI of the enhanced subframe is less than the length of one subframe; and/or the length of an uplink TTI of the enhanced subframe is less than the length of one subframe.

Optionally, the length of a downlink TTI of the enhanced subframe is equal to the length of half a subframe; or the length of a downlink TTI of the enhanced subframe is equal to the length of the DL portion in the enhanced subframe; and/or the length of an uplink TTI of the enhanced subframe is equal to the length of half a subframe; or the length of an uplink TTI of the enhanced subframe is equal to the length of the UL portion in the enhanced subframe.

Optionally, the radio frame further includes at least one downlink subframe and/or at least one uplink subframe.

Optionally, the length of a downlink TTI of the downlink subframe is equal to or less than the length of one subframe; and/or the length of an uplink TTI of the uplink subframe is equal to or less than the length of one subframe.

Optionally, the user equipment determines the radio frame, including:

the user equipment determining the radio frame according to the configuration of a network side device.

As can be seen from the above contents, a radio frame for transmission between a network side device and a user equipment according to an embodiment of the invention includes an enhanced subframe, which includes a UL portion and a DL portion. A TDD frame structure according to an embodiment of the invention can not only reduce the user plane delay on the basis of maintaining the service flexibility, but also maintain the backward compatibility of a system.

These computer program instructions can also be loaded into a computer or other programmable data processing equipment, so as to execute a series of operation steps on the computer or other programmable devices to generate processing realized by the computer, so that an instruction executed on a computer or other programmable devices provides steps for implementing functions specified in one or more processes of a process diagram and/or one or more boxes of a block diagram.

While preferred embodiments of the present invention have been described, those skilled in the art can make other alterations and modifications to these embodiments once they know about the basic creative concept. Therefore, the appended claims are intended to be construed to include the preferred embodiments and fall within all alterations and modifications to the scope of the present invention.

Obviously, those skilled in the art can make various modifications and variants to the present invention without departure from the spirit and scope of the present invention. Thus, if these modifications and variants of the present invention fall within the scope of claims of the present invention and equivalents thereof, then the present invention is also intended to include these modifications and variants.

The invention claimed is:

1. A method for transmitting data, comprising:
   determining, by a network side device, a radio frame, wherein the radio frame comprises an enhanced subframe, and the enhanced subframe comprises an uplink (UL) portion, a downlink (DL) portion, and a guard period (GP) portion, wherein the GP portion in the enhanced subframe is at the beginning of the enhanced subframe; and
   communicating, by the network side device, with a user equipment through the radio frame;
   wherein determining, by the network side device, the radio frame, comprising:
   determining, by the network side device, a length of the UL portion and a length of the DL portion in the enhanced subframe;
   wherein the length of the UL portion is different from the length of the DL portion in the enhanced subframe;
   when the length of the UL portion is different from the length of the DL portion in the enhanced subframe, the enhanced subframe in the radio frame comprises an enhanced subframe of a second type, wherein the UL portion is prior to the DL portion in the enhanced subframe of the second type.

2. The method according to claim 1, wherein communicating, by the network side device, with the user equipment through the radio frame, comprising:
   receiving, by the network side device, a part of or all of uplink pilot, uplink service data and uplink control signaling through the UL portion in the enhanced subframe; and/or,
   transmitting, by the network side device, a part of or all of downlink pilot, downlink service data and downlink control signaling through the DL portion in the enhanced subframe.

3. The method according to claim 1, wherein when the length of the UL portion is equal to the length of the DL portion in the enhanced subframe, the enhanced subframe in the radio frame comprises an enhanced subframe of a first type and/or an enhanced subframe of a second type; when the length of the UL portion is different from the length of the DL portion in the enhanced subframe, the enhanced subframe in the radio frame further comprises an enhanced subframe of the first type; wherein the DL portion is prior to the UL portion in the enhanced subframe of the first type; and the UL portion is prior to the DL portion in the enhanced subframe of the second type; and/or,
   wherein the UL portion in the enhanced subframe comprises N orthogonal frequency division multiplexing OFDM symbols, wherein N is a positive integer; and the DL portion in the enhanced subframe comprises M OFDM symbols, where M is a positive integer; and/or
   wherein the length of the UL portion in different enhanced subframes of the radio frame is equal or different; and/or
   wherein the length of the DL portion in different enhanced subframes of the radio frame is equal or different.

4. The method according to claim 3, wherein
   M is equal to N; and/or,
   wherein in a plurality of the enhanced subframes with GP portions in the radio frame, the positions of the GP portions in their respective enhanced subframes are completely identical or partially identical or completely different.

5. The method according to claim 1, wherein a length of a downlink transmission time interval (TTI) of the enhanced subframe is less than a length of one subframe; and/or
   the length of an uplink TTI of the enhanced subframe is less than the length of one subframe.

6. The method according to claim 5, wherein the length of a downlink TTI of the enhanced subframe is equal to the length of half a subframe; or the length of a downlink TTI of the enhanced subframe is equal to the length of the DL portion in the enhanced subframe; and/or
   the length of an uplink TTI of the enhanced subframe is equal to the length of half a subframe; or the length of an uplink TTI of the enhanced subframe is equal to the length of the UL portion in the enhanced subframe.

7. The method according to claim 1, wherein the radio frame further comprises at least one downlink subframe and/or at least one uplink subframe.

8. The method according to claim 7, wherein the length of a downlink TTI of the downlink subframe is equal to or less than the length of one subframe; and/or
   the length of an uplink TTI of the uplink subframe is equal to or less than the length of one subframe.

9. The method according to claim 1, further comprising:
   configuring, by the network side device, the radio frame for the user equipment.

10. A method for transmitting data, comprising:
    determining, by a user equipment, a radio frame, wherein the radio frame comprises an enhanced subframe, and the enhanced subframe comprises an uplink (UL) portion, a downlink (DL) portion, and a guard period (GP) portion, wherein the GP portion in the enhanced subframe is at the beginning of the enhanced subframe; and
    communicating, by the user equipment, with a network side device through the radio frame;
    wherein determining, by the user equipment, the radio frame, comprising:

determining, by the user equipment, a length of the UL portion and a length of the DL portion in the enhanced subframe;
wherein the length of the UL portion is different from the length of the DL portion in the enhanced subframe;
when the length of the UL portion is different from the length of the DL portion in the enhanced subframe, the enhanced subframe in the radio frame comprises an enhanced subframe of a second type, wherein the UL portion is prior to the DL portion in the enhanced subframe of the second type.

11. The method according to claim 10, wherein communicating, by the user equipment, with the network side device through the radio frame, comprising:
transmitting, by the user equipment, a part of or all of uplink pilot, uplink service data and uplink control signaling through the UL portion in the enhanced subframe; and/or,
receiving, by the user equipment, a part of or all of downlink pilot, downlink service data and downlink control signaling through the DL portion in the enhanced subframe.

12. The method according to claim 10, wherein when the length of the UL portion is equal to the length of the DL portion in the enhanced subframe, the enhanced subframe in the radio frame comprises an enhanced subframe of a first type and/or an enhanced subframe of a second type; when the length of the UL portion is different form the length of the DL portion in the enhanced subframe, the enhanced subframe in the radio frame further comprises an enhanced subframe of the first type; wherein, the DL portion is prior to the UL portion in the enhanced subframe of the first type; and the UL portion is prior to the DL portion in the enhanced subframe of the second type; and/or
wherein the UL portion in the enhanced subframe comprises N OFDM symbols, where N is a positive integer; and the DL portion in the enhanced subframe comprises M OFDM symbols, where M is a positive integer; and/or
wherein the length of the UL portion in different enhanced subframes of the radio frame is equal or different; and/or
when the length of the DL portion in different enhanced subframes of the radio frame is equal or different.

13. The method according to claim 12,
wherein M is equal to N; and/or
wherein in a plurality of the enhanced subframes with GP portions in the radio frame, the positions of the GP portions in their respective enhanced subframes are completely identical or partially identical or completely different.

14. The method according to claim 10, wherein a length of a downlink TTI of the enhanced subframe is less than a length of one subframe; and/or
the length of an uplink TTI of the enhanced subframe is less than the length of one subframe.

15. The method according to claim 14, wherein the length of a downlink TTI of the enhanced subframe is equal to the length of half a subframe; or the length of a downlink TTI of the enhanced subframe is equal to the length of the DL portion in the enhanced subframe; and/or
the length of an uplink TTI of the enhanced subframe is equal to the length of half a subframe; or the length of an uplink TTI of the enhanced subframe is equal to the length of the UL portion in the enhanced subframe.

16. The method according to claim 10, wherein the radio frame further comprises at least one downlink subframe and/or at least one uplink subframe.

17. The method according to claim 16, wherein the length of a downlink TTI of the downlink subframe is equal to or less than the length of one subframe; and/or
the length of an uplink TTI of the uplink subframe is equal to or less than the length of one subframe.

18. The method according to claim 10, wherein determining, by the user equipment, the radio frame, comprising:
determining, by the user equipment, the radio frame according to configuration of the network side device.

19. A network side device for transmitting data, comprising:
a first determination module, configured for determining a radio frame, wherein the radio frame comprises an enhanced subframe, and the enhanced subframe comprises an uplink (UL) portion, a downlink (DL) portion, and a guard period (GP) portion, wherein the GP portion in the enhanced subframe is at the beginning of the enhanced subframe; and
a first communication module, configured for communicating with a user equipment through the radio frame;
wherein the first determination module is further configured for: determining a length of the UL portion and a length of the DL portion in the enhanced subframe;
wherein the length of the UL portion is different from the length of the DL portion in the enhanced subframe;
when the length of the UL portion is different from the length of the DL portion in the enhanced subframe, the enhanced subframe in the radio frame comprises an enhanced subframe of a second type, wherein the UL portion is prior to the DL portion in the enhanced subframe of the second type.

20. The network side device according to claim 19, wherein the first communication module is configured for:
receiving a part of or all of uplink pilot, uplink service data and uplink control signaling through the UL portion in the enhanced subframe; and/or,
transmitting a part of or all of downlink pilot, downlink service data and downlink control signaling through the DL portion in the enhanced subframe.

21. A user equipment for transmitting data, comprising:
a second determination module, configured for determining a radio frame, wherein the radio frame comprises an enhanced subframe, and the enhanced subframe comprises an uplink (UL) portion, and a downlink (DL) portion, and a guard period (GP) portion, wherein the GP portion in the enhanced subframe is at the beginning of the enhanced subframe; and
a second communication module, configured for communicating with a network side device through the radio frame;
wherein the second determination module is further configured for: determining a length of the UL portion and a length of the DL portion in the enhanced subframe;
wherein the length of the UL portion is different from the length of the DL portion in the enhanced subframe;
when the length of the UL portion is different from the length of the DL portion in the enhanced subframe, the enhanced subframe in the radio frame comprises an enhanced subframe of a second type, wherein the UL portion is prior to the DL portion in the enhanced subframe of the second type.

22. The user equipment according to claim 21, wherein the second communication module is configured for:

transmitting a part of or all of uplink pilot, uplink service data and uplink control signaling through the UL portion in the enhanced subframe; and/or, receiving a part of or all of downlink pilot, downlink service data and downlink control signaling through the DL portion in the enhanced subframe.

* * * * *